US009928415B2

(12) United States Patent
Wang et al.

(10) Patent No.: US 9,928,415 B2
(45) Date of Patent: Mar. 27, 2018

(54) MATHEMATICAL FORMULA LEARNER SUPPORT SYSTEM

(71) Applicant: FUJITSU LIMITED, Kawasaki-shi, Kanagawa (JP)

(72) Inventors: Jun Wang, San Jose, CA (US); Kanji Uchino, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 132 days.

(21) Appl. No.: 14/694,852

(22) Filed: Apr. 23, 2015

(65) Prior Publication Data

US 2016/0314348 A1 Oct. 27, 2016

(51) Int. Cl.

| | |
|---|---|
| ***G06F 17/00*** | (2006.01) |
| ***G06K 9/00*** | (2006.01) |
| ***G06F 17/21*** | (2006.01) |
| ***G09B 19/00*** | (2006.01) |
| ***G09B 5/02*** | (2006.01) |

(52) U.S. Cl.

CPC ....... *G06K 9/00442* (2013.01); *G06F 17/215* (2013.01); *G09B 5/02* (2013.01); *G09B 19/00* (2013.01); *G06K 2209/01* (2013.01)

(58) Field of Classification Search

None

See application file for complete search history.

(56) References Cited

U.S. PATENT DOCUMENTS

| | | | | |
|---|---|---|---|---|
| 2004/0090439 | A1* | 5/2004 | Dillner | G06K 9/00402 345/440 |
| 2008/0066052 | A1* | 3/2008 | Wolfram | G06F 8/30 717/109 |
| 2011/0225494 | A1* | 9/2011 | Shmuylovich | G06F 3/04883 715/705 |
| 2015/0278691 | A1* | 10/2015 | Xia | G06N 5/04 706/11 |

OTHER PUBLICATIONS

Michael Kohlhase, Ioan Sucan, A Search Engine for Mathematical Formulae, Artificial Intelligence and Symbolic Computation Lecture Notes in Computer Science vol. 4120, 2006.

Xiaoyan Lin et al., A mathematics retrieval system for formulae in layout presentations, SIGIR '14 Proceedings of the 37th international ACM SIGIR conference on Research & development in information retrieval. Jun. 16, 2008.

T. Schellenberg, B. Yuan, and R. Zanibbi. Layout-based substitution tree indexing and retrieval for mathematical expressions. In IS&T/SPIE Electronic Imaging, vol. 8297, p. 82970I, 2012.

(Continued)

*Primary Examiner* — Keith Bloomquist

(74) *Attorney, Agent, or Firm* — Maschoff Brennan

(57) ABSTRACT

A method to identify information about a mathematical formula may include receiving a mathematical formula included in a first electronic document. The method may also include generating a formatted formula from the mathematical formula. The method may also include finding a returned formula that is similar to or the same as the formatted formula in a plurality of mathematical formulae.

(Continued)

The method may also include identifying from at least one other electronic document content that describes the returned formula and includes a derivation of the returned formula.

17 Claims, 15 Drawing Sheets

(56) References Cited

OTHER PUBLICATIONS http://www.latexsearch.com/ Retrieved on Apr. 23, 2015.
http://mathworld.wolfram.com/ Retrieved on Apr. 23, 2015.
Xiaoyan Lin, et al., A Text Line Detection Method for Mathematical Formula Recognition, 2013 12th International Conference on Document Analysis and Recognition.
R. Zanibbi, D. Blostein, and J. R. Cordy. Recognizing mathematical expressions using tree transformation. IEEE Trans. on Pattern Analysis and Machine Intelligence, 24(11):1455-1467, 2002.

* cited by examiner

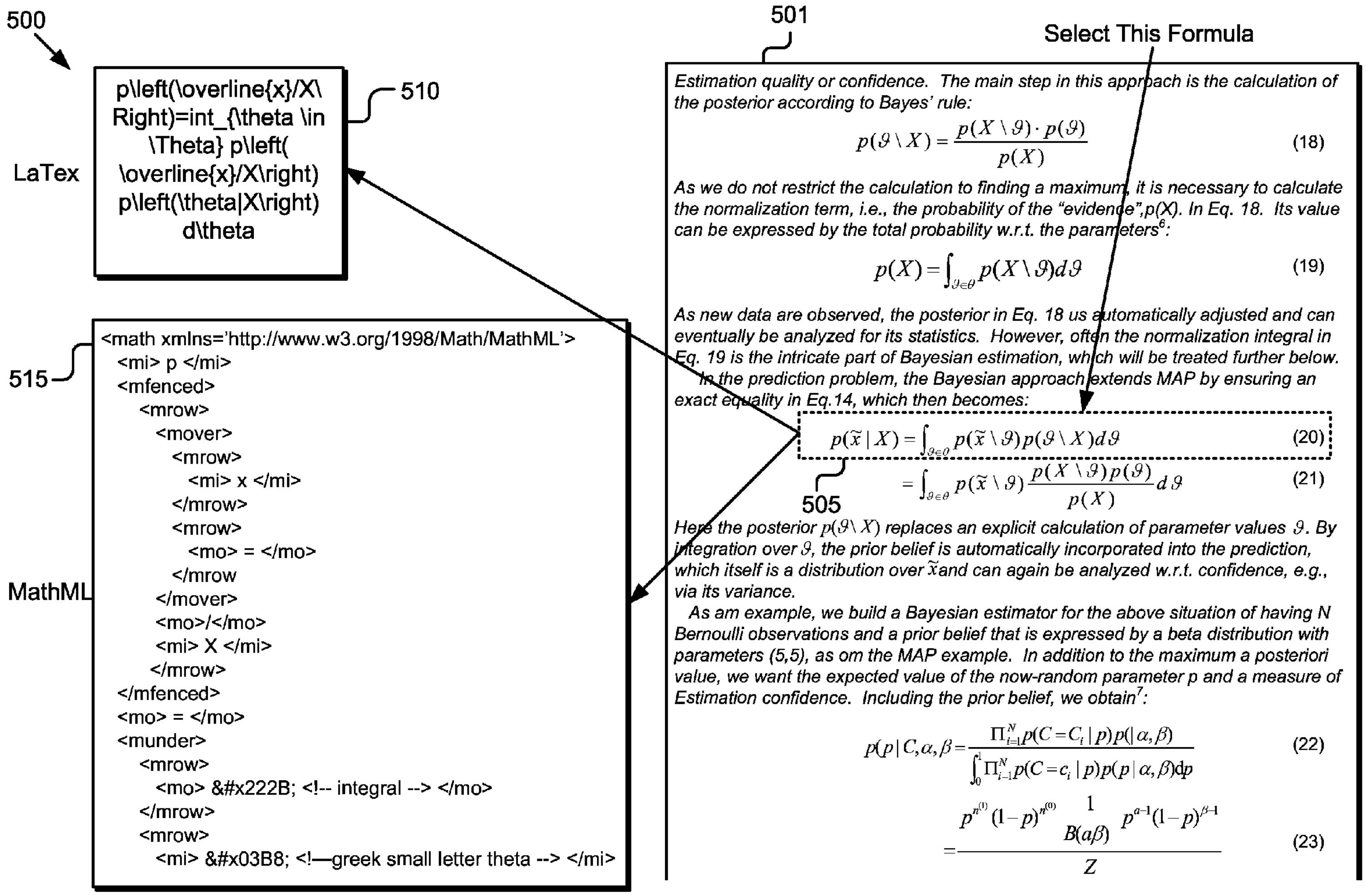

FIG. 5

501 — Select This Formula

*Estimation quality or confidence. The main step in this approach is the calculation of the posterior according to Bayes' rule:*

$$p(\vartheta \setminus X) = \frac{p(X \setminus \vartheta) \cdot p(\vartheta)}{p(X)} \quad (18)$$

*As we do not restrict the calculation to finding a maximum, it is necessary to calculate the normalization term, i.e., the probability of the "evidence", p(X). In Eq. 18. Its value can be expressed by the total probability w.r.t. the parameters[6]:*

$$p(X) = \int_{\vartheta \in \theta} p(X \setminus \vartheta) d\vartheta \quad (19)$$

*As new data are observed, the posterior in Eq. 18 us automatically adjusted and can eventually be analyzed for its statistics. However, often the normalization integral in Eq. 19 is the intricate part of Bayesian estimation, which will be treated further below. In the prediction problem, the Bayesian approach extends MAP by ensuring an exact equality in Eq.14, which then becomes:*

$$p(\tilde{x}|X) = \int_{\vartheta \in \theta} p(\tilde{x} \setminus \vartheta) p(\vartheta \setminus X) d\vartheta \quad (20)$$

$$= \int_{\vartheta \in \theta} p(\tilde{x} \setminus \vartheta) \frac{p(X \setminus \vartheta) p(\vartheta)}{p(X)} d\vartheta \quad (21)$$

505

*Here the posterior $p(\vartheta \setminus X)$ replaces an explicit calculation of parameter values $\vartheta$. By integration over $\vartheta$, the prior belief is automatically incorporated into the prediction, which itself is a distribution over $\tilde{x}$ and can again be analyzed w.r.t. confidence, e.g., via its variance.*

*As an example, we build a Bayesian estimator for the above situation of having N Bernoulli observations and a prior belief that is expressed by a beta distribution with parameters (5,5), as om the MAP example. In addition to the maximum a posteriori value, we want the expected value of the now-random parameter p and a measure of Estimation confidence. Including the prior belief, we obtain[7]:*

$$p(p|C,\alpha,\beta) = \frac{\prod_{i=1}^{N} p(C=C_i|p) p(p|\alpha,\beta)}{\int_0^1 \prod_{i=1}^{N} p(C=c_i|p) p(p|\alpha,\beta) dp} \quad (22)$$

$$= \frac{p^{n^{(1)}}(1-p)^{n^{(0)}} \frac{1}{B(\alpha,\beta)} p^{\alpha-1}(1-p)^{\beta-1}}{Z} \quad (23)$$

510 — LaTex

```
p\left(\overline{x}|X\right)=int_{\theta \in
\Theta} p\left(
\overline{x}|X\right)
p\left(\theta|X\right)
d\theta
```

515 — MathML

```
<math xmlns='http://www.w3.org/1998/Math/MathML'>
<mi> p </mi>
<mfenced>
  <mrow>
    <mover>
      <mrow>
        <mi> x </mi>
      </mrow>
    </mover>
    <mo> = </mo>
    <mrow>
    </mrow>
    <mover>
      <mo>/</mo>
    </mover>
    <mi> X </mi>
  </mrow>
</mfenced>
<mo> = </mo>
<munder>
  <mo> ∫ <!-- integral --> </mo>
</munder>
<mrow>
  <mi> θ <!-- greek small letter theta --> </mi>
```

500

Example of Normalized Formula

$$C \times V + C, C + C \times V \rightarrow C + C \times V$$

| L | Original | Generalized | Generalized (contents) |
|---|----------|-------------|------------------------|
| 1 | $(x+y)x\dfrac{a}{b}$ | $(*) \times \dfrac{*}{*}$ | \<mo o='×'\><br>\<mfenced\> \</mfenced\><br>\<mfrac\> \</mfrac\> \</mo\> |
| 2 | $(x+y)$ | $(*)$ | \<mfenced\> \<mrow\><br>\</mrow\> \</mfenced\> |
| 2 | $\dfrac{a}{b}$ | $\dfrac{*}{*}$ | \<mfrac\> \<mi\> \</mi\><br>\<mi\> \</mi\> \</mfrac\> |
| 3 | $x+y$ | $*+*$ | \<mo o='+'\> \<mi\> \</mi\><br>\<mi\> \</mi\> \</mo\> |

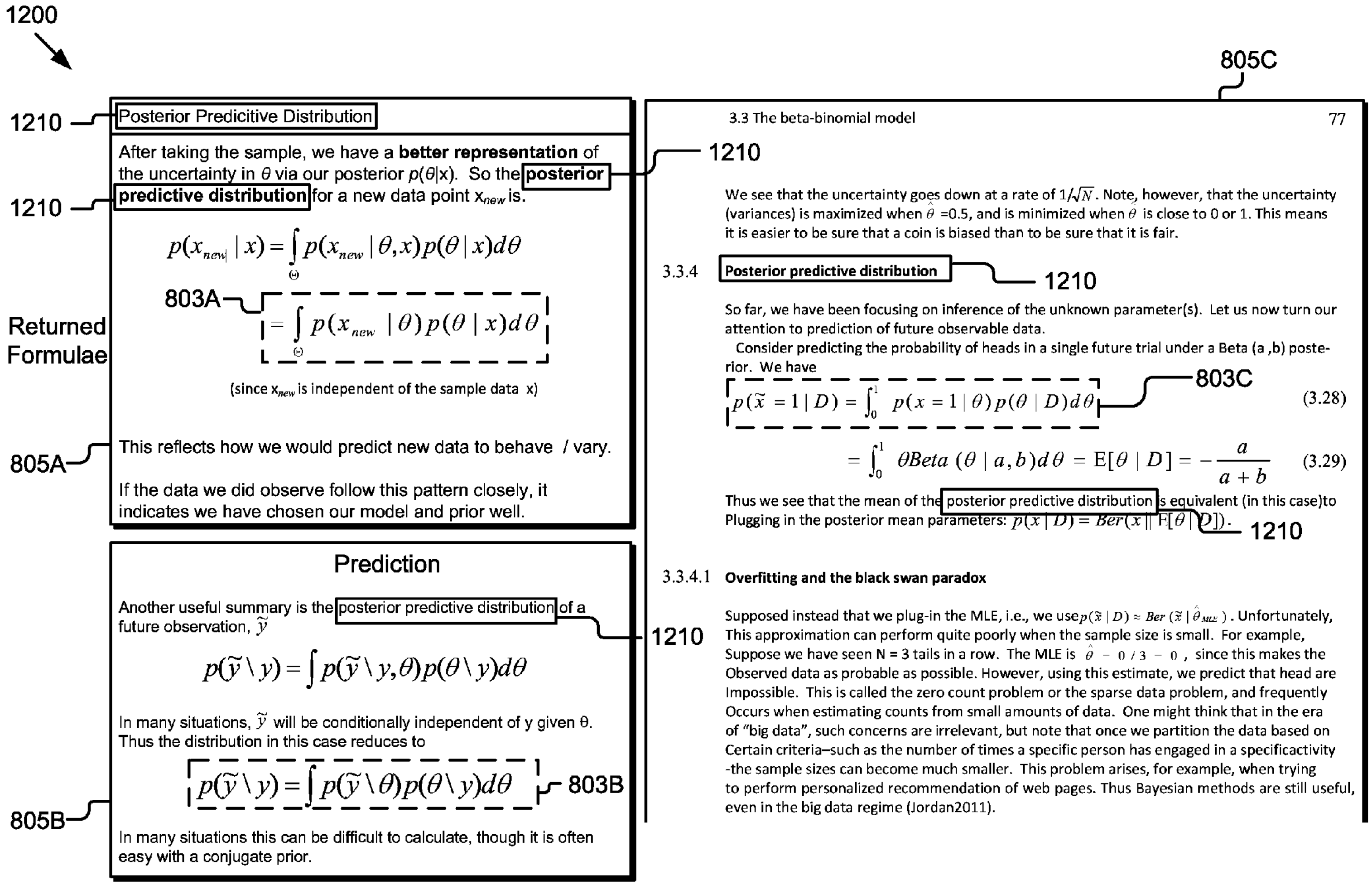

FIG. 12

Posterior Predicitive Distribution

After taking the sample, we have a better representation of the uncertainty in $\theta$ via our posterior $p(\theta|x)$. So the posterior predictive distribution for a new data point $x_{new}$ is.

$$p(x_{new}|x) = \int_\Theta p(x_{new}|\theta,x)p(\theta|x)d\theta$$

$$= \int_\Theta p(x_{new}|\theta)p(\theta|x)d\theta$$

(since $x_{new}$ is independent of the sample data x)

This reflects how we would predict new data to behave / vary.

If the data we did observe follow this pattern closely, it indicates we have chosen our model and prior well.

Prediction

Another useful summary is the posterior predictive distribution of a future observation, $\tilde{y}$ $$p(\tilde{y}\backslash y) = \int p(\tilde{y}\backslash y,\theta)p(\theta\backslash y)d\theta$$

In many situations, $\tilde{y}$ will be conditionally independent of y given $\theta$. Thus the distribution in this case reduces to $$\int p(\tilde{y}\backslash\theta)p(\theta\backslash y)d\theta$$

In many situations this can be difficult to calculate, though it is often easy with a conjugate prior.

---

3.3 The beta-binomial model 77

We see that the uncertainty goes down at a rate of $1/\sqrt{N}$. Note, however, that the uncertainty (variances) is maximized when $\theta$ =0.5, and is minimized when $\theta$ is close to 0 or 1. This means it is easier to be sure that a coin is biased than to be sure that it is fair.

3.3.4 Posterior predictive distribution

So far, we have been focusing on inference of the unknown parameter(s). Let us now turn our attention to prediction of future observable data.

Consider predicting the probability of heads in a single future trial under a Beta (a,b) posterior. We have $$p(\tilde{x}=1|D) = \int_0^1 p(x=1|\theta)p(\theta|D)d\theta$$ (3.28)

$$= \int_0^1 \theta Beta(\theta|a,b)d\theta = E[\theta|D] = \frac{a}{a+b}$$ (3.29)

Thus we see that the mean of the posterior predictive distribution is equivalent (in this case) to Plugging in the posterior mean parameters: $p(\tilde{x}|D) = Ber(x|E[\theta|D])$.

3.3.4.1 Overfitting and the black swan paradox

Supposed instead that we plug-in the MLE, i.e., we use $p(\tilde{x}|D) \approx Ber(\tilde{x}|\hat{\theta}_{MLE})$. Unfortunately, This approximation can perform quite poorly when the sample size is small. For example, Suppose we have seen N = 3 tails in a row. The MLE is $\hat{\theta} = 0/3 = 0$, since this makes the Observed data as probable as possible. However, using this estimate, we predict that head are Impossible. This is called the zero count problem or the sparse data problem, and frequently Occurs when estimating counts from small amounts of data. One might think that in the era of "big data", such concerns are irrelevant, but note that once we partition the data based on Certain criteria–such as the number of times a specific person has engaged in a specificactivity –the sample sizes can become much smaller. This problem arises, for example, when trying to perform personalized recommendation of web pages. Thus Bayesian methods are still useful, even in the big data regime (Jordan2011).

MATHEMATICAL FORMULA LEARNER SUPPORT SYSTEM

FIELD

The embodiments discussed herein are related to a mathematical formula learner support system.

BACKGROUND

Online education systems may provide information about a mathematical formula. When a learner, especially a beginner, is reading a paper/book or studying learning materials, he/she may encounter specific mathematical formulae which omit detail of derivation due to space limitations or compactness. As such, the learner may be unable to figure out why and how the mathematical formulae can be developed.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method to identify information about a mathematical formula may include receiving a mathematical formula included in a first electronic document. The method may also include generating a formatted formula from the mathematical formula. The method may also include finding a returned formula that is similar to or the same as the formatted formula in multiple mathematical formulae. The method may also include identifying from at least one other electronic document formula derivation that includes a derivation of the returned formula.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 5 is an illustration of an example mathematical formula that may be selected;

FIG. 7B illustrates an example normalized formula;

FIG. 7C illustrates example generalized formulae;

FIG. 12 is an illustration of examples of related content.

DESCRIPTION OF EMBODIMENTS

Figure 1:
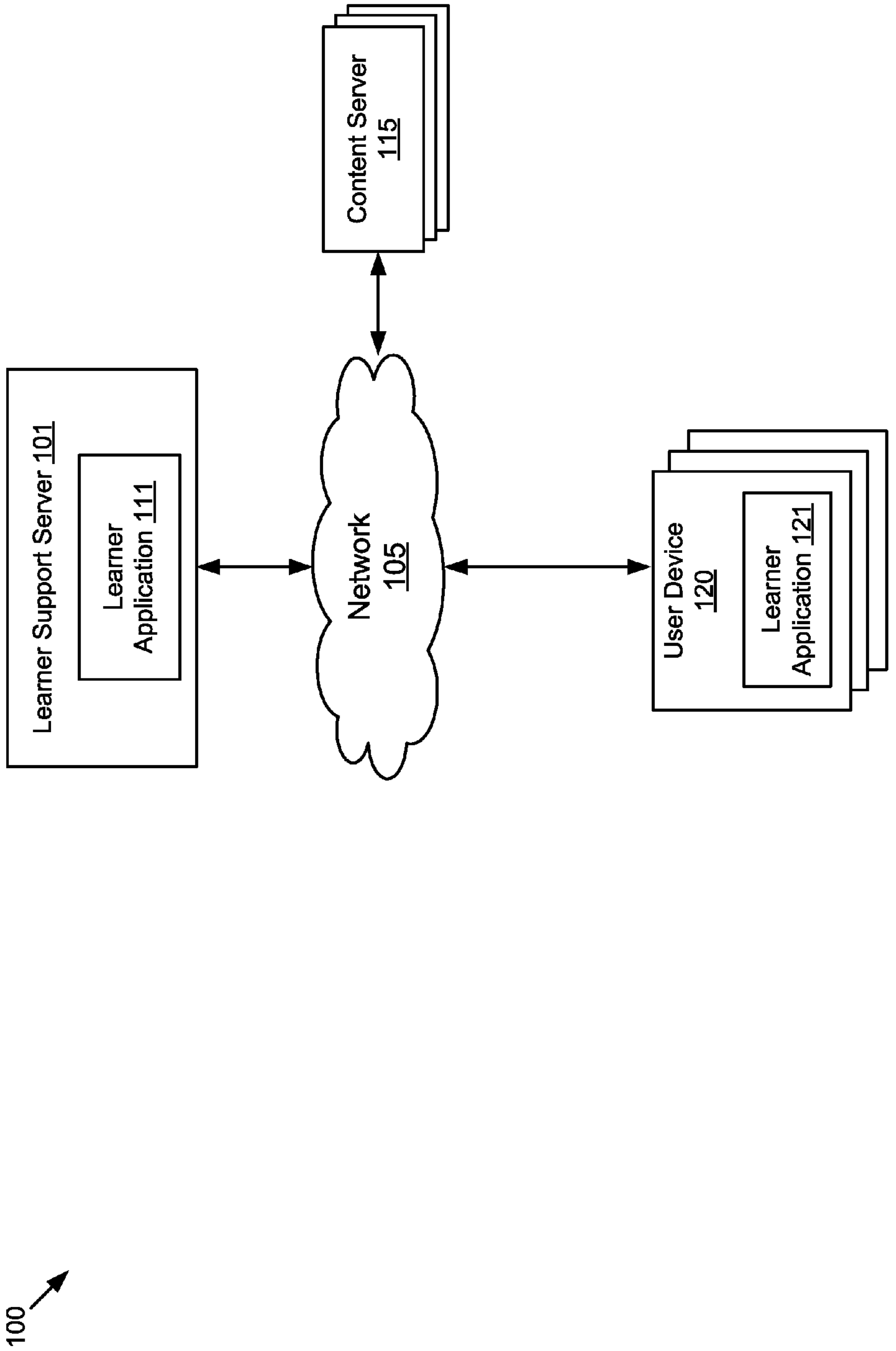
FIG. 1 illustrates an example block diagram of a learner support system.

Online education systems may provide information about a mathematical formula. When a learner, especially a beginner, is reading a paper/book or studying learning materials, he/she may encounter specific mathematical formulae which omit detail of derivation due to space limitations or compactness. As such, the learner may be unable to figure out why and how the mathematical formulae can be developed.

If the learner knows the name of a formula, the learner can input the name to a general search engine, and the search engine will return many documents including the name of the mathematical formula, but the learner still manually checks if a returned document contains the mathematical formula, and further manually checks if the returned document contains a detail of derivation of the mathematical formula. This is a very inefficient and time-consuming task.

If the learner does not know the name of mathematical formula, the learner can manually input the mathematical formula with a specific format into a special search engine for mathematical formulae. The input process may be time consuming and error prone, especially when the mathematical formula is long and includes many different variables and/or operators. The mathematical formulae search engine may return many documents that contain returned mathematical formulae, and the learner still needs to manually check if a returned document contains a detail of derivation of the mathematical formula.

In comparison, some embodiments described herein may identify information about a mathematical formula without requiring a learner to know the name or term related to the mathematical formula or manually input the mathematical formula. For example, the learner may encounter the mathematical formula in an electronic document and may desire more detailed derivation information about the mathematical formula than is included in the electronic document. Accordingly, the learner may provide input effective to select the mathematical formula directly from the electronic document, and generate specific format input into a special search engine for mathematical formulae. In this case, the mathematical formulae search engine may return many documents that contain returned mathematical formulae similar to or the same as the input formulae, and the learner still needs to manually check if a returned document contains a detail of derivation of the mathematical formula.

Compared to the embodiments mentioned above, some embodiments included herein do not just find the closest matched formula, but go one step further and try to find content with a detailed explanation and derivation of the interested formulae automatically. Some embodiments also try to find related technology terms of the formulae whose name is unknown.

Embodiments of the present invention will be explained with reference to the accompanying drawings. With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

FIG. 1 illustrates an example block diagram of a learner support system 100 in which some embodiments may be implemented. The learner support system 100 may include a network 105, a learner support server 101, user devices 120, and content servers 115.

In general, the network 105 may include one or more wide area networks (WANs) and/or local area networks (LANs) that enable the learner application 111 or 121 to access the content servers 115 and/or that enable one or more of the user devices 120 and the learner support server 101 to communicate with each other and/or with the content servers 115. In some embodiments, the network 105 includes the Internet, including a global internetwork formed by logical and physical connections between multiple WANs and/or LANs. Alternately or additionally, the network 105 may include one or more cellular (Radio Frequency) RF networks and/or one or more wired and/or wireless networks, such as 802.xx networks, Bluetooth access points, wireless access points, or Internet Protocol (IP)-based networks. The network 105 may also include servers that enable one type of network to interface with another type of network.

The learner support server 101 may include a processor, a memory, and a learner application 111. In some embodiments, the learner application 111 on the learner support server 101 may be configured to receive a mathematical formula from the user device 120. For example, the learner application 111 may receive the mathematical formula after selection thereof from an electronic document. The electronic document may include a Portable Document Format document (.pdf document), a web page (e.g., a hypertext markup language (HTML) document), or other suitable electronic document. The mathematical formula included in the electronic document may be included in an image, a vector graphic, or text of the electronic document.

The learner application 111 may generate a formatted formula from the mathematical formula (e.g., selected or otherwise input by a user) that may be used to find a returned formula from one or more electronic documents generated and/or hosted by one or more of the content servers 115. Examples of the electronic documents and/or origins thereof are described below. The learner application 111 may normalize, generalize, and tokenize the mathematical formula before searching for the returned formula to reduce processing time and find better matches for the mathematical formula. The electronic document that includes the returned formula may be generated and/or hosted by one of the content servers 115.

In some embodiments, a crawler may crawl multiple online education resource websites, download the crawled contents, and store the crawled contents in the content servers 115. The crawler may be included as part of the learner application 111, the content servers 115, or another location that is communicatively coupled to the network 105. The learner application 111 processes the crawled contents stored in the content servers 115, scan the crawled contents to check for electronic documents that include mathematical formulae, and for the electronic documents that include mathematical formulae, generates an index of formulae that is part of a special search engine for mathematical formulae. The learner application 111 may then find returned formulae in the index of formulae that are similar to or the same as the mathematical formula (and/or that are similar to or the same as the formatted formula), determine the electronic documents that included the returned formulae, and search the corresponding electronic documents to identify a formula derivation.

The formula derivation may include a derivation of the returned formula. For example, the learner application 111 may locate a position of the returned formula in at least one electronic document stored by the content server 115, set a boundary around the returned formula, and locate other formulae within the boundary. Based on the proximity and the similarity of the other formulae to the returned formula, the other formulae may describe the derivation of the returned formula.

The learner application 111 may also be configured to identify related content such as a name or terminology that relates to the mathematical formula. For example, the learner application 111 may identify returned formulae, set a boundary around each of the returned formulae, retrieve text within the boundary, and extract terminology that is repeated within the boundaries of the returned formulae. The terminology may be used to better understand the mathematical formulae.

Each of the user devices 120 may include a desktop computer, a laptop computer, a tablet computer, a mobile phone, a smartphone, a personal digital assistant (PDA), an e-reader device, or other suitable user device.

Each of the user devices 120 may include and/or may be communicatively coupled to a display device (not shown) that is generally configured to render and display electronic documents. Alternately or additionally, each of the user devices 120 may include a tool for selecting mathematical formulae within the electronic documents. The display device may include a built-in monitor such as may be implemented in a laptop computer, a tablet computer, a mobile phone, a smartphone, a PDA, an e-reader device, or other user device 120 with a built-in monitor. Alternately or additionally, the display device may be implemented as an external monitor, a projector, a television, or other suitable display device that may be separate from and communicatively coupled to the user device 120.

In some embodiments, the user devices 120 each include a learner application 121 that is configured to perform some or all of the steps described with reference to the learner application 111 stored on the learner support server 101. For example, the learner application 121 may include a user interface module for generating the tool for a learner to select a mathematical formula from an electronic document. In other embodiments, the user device 120 accesses the learner application 111 on the learner support server 101, for example, by accessing a browser-based application. Alternately or additionally, the learner application 121 on each of the user devices 120 may communicate with the learner application 111 on the learner support server 101 in a client-server relationship.

In some examples, the learner application 121 may also identify the returned formula from electronic documents stored and indexed by the content server 115, identify a formula derivation, and/or identify related content. In some other examples, the learner application 121 transmits the selected mathematical formula to the learner application 111 on the learner support server 101. Although multiple user devices 120 are illustrated in FIG. 1, the learner support system 100 may more generally include one or more user devices 120.

The content servers 115 may include applications and/or hardware (e.g., rack-mounted server computers, blade server computers, and/or other computer hardware) that are configured to generate and/or host electronic documents. The electronic documents may include open education resources (hereinafter "OERs"), such as open courseware (OCW) learning materials, massive open online courses (MOOC) learning materials, course pages for courses taught at educational institutions by individuals including professors and lecturers, lecture notes associated with such courses, online publications including journal articles and/or conference papers, online encyclopedias, books or the like or any combination thereof. Although multiple content servers 115 are illustrated in FIG. 1, the learner support system 100 may more generally include one or more content servers 115.

The content servers 115, or more particularly the electronic documents stored therein, may be crawled and otherwise processed by one or more of the learner application 111 and 121 to create an index of formulae that are included in the electronic documents, as described in more detail below. One or more of the learner applications 111 and 121 may use the index of formulae to find returned formulae and may analyze the particular electronic documents that include the returned formulae to identify a formula derivation and/or related content.

In some embodiments, one or both of the learner applications 111, 121 may be implemented using hardware including a Field-Programmable Gate Array (FPGA) or an Application-Specific Integrated Circuit (ASIC). In some other embodiments, one or both of the learner applications 111, 121 may be implemented using a combination of hardware and software. The learner applications 111, 121 may be stored in a combination of the devices and servers, or in one of the devices or servers of FIG. 1. An example embodiment of a learner application that may correspond to one or both of the learner applications 111, 121 is described below in more detail.

Figure 2:
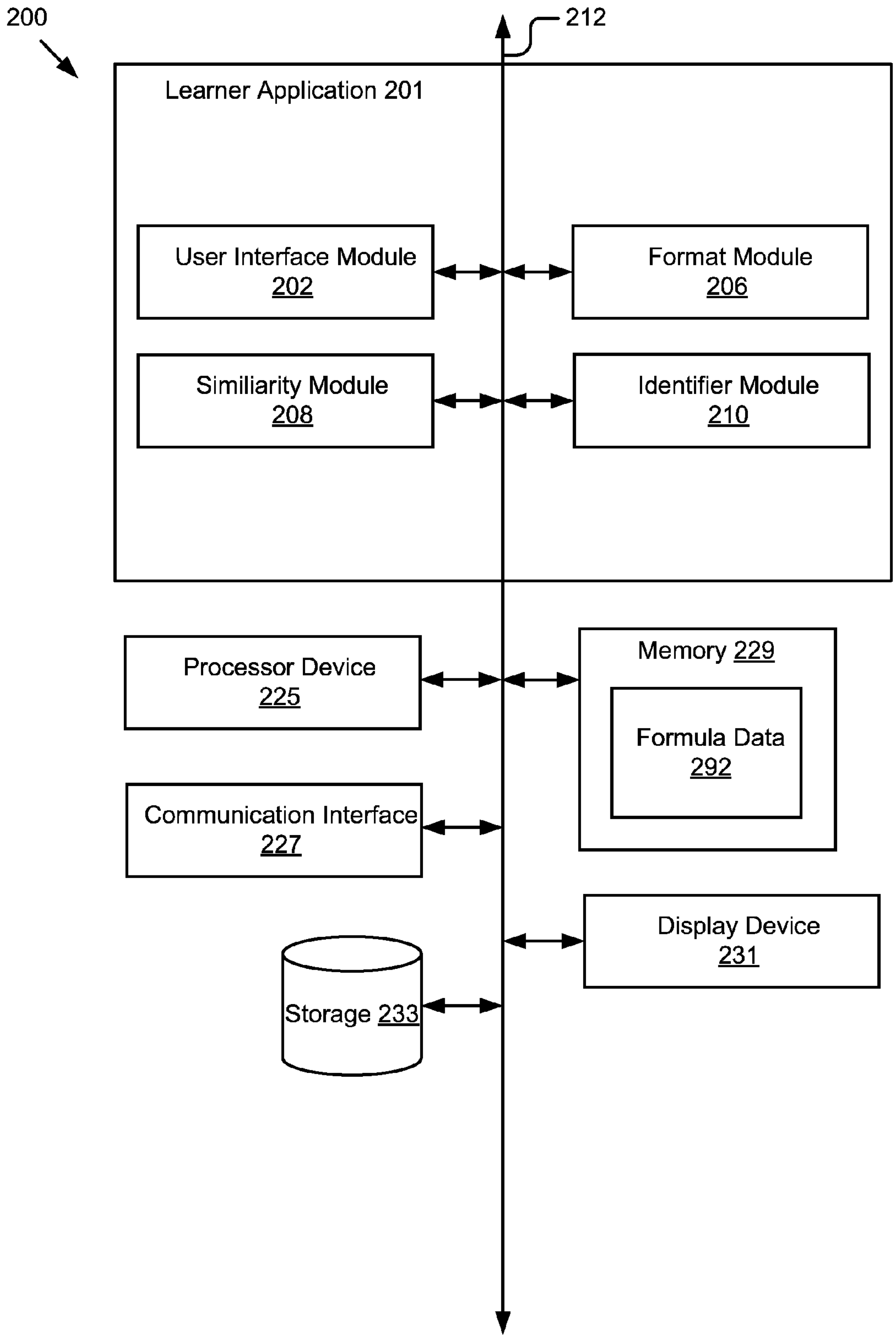
FIG. 2 illustrates an example block diagram of a learner support device.

FIG. 2 illustrates an example block diagram of a learner support device (hereinafter "device") 200 arranged in accordance with at least one embodiments described herein. The device 200 may include or correspond to one or more of the learner support server 101 and the user devices 120 of FIG. 1. The device 200 may be implemented as a computing device having any suitable form factor, such as a rack-mount server computer, a blade server computer, a desktop computer, a laptop computer, a tablet computer, a mobile phone, a smartphone, a personal digital assistant (PDA), an e-reader device, or other suitable computing device.

The device 200 may include a learner application 201, a processor device 225, a communication interface 227, a storage 233, and a memory 229 according to some examples. The components of the device 200 may be communicatively coupled by a bus 212. The bus 212 may include a memory bus, a storage interface bus, a bus/interface controller, an interface bus, or the like or any combination thereof. In some embodiments, the device 200 additionally includes a display device 231 coupled to the bus 212.

The processor device 225 includes an arithmetic logic unit, a microprocessor, a general-purpose controller, or some other processor array to perform or control performance of operations as described herein. The processor device 225 processes data signals and may include various computing architectures including a Complex Instruction Set Computer (CISC) architecture, a Reduced Instruction Set Computer (RISC) architecture, or an architecture implementing a combination of instruction sets. Although FIG. 2 includes a single processor device 225, multiple processor devices may be included. Other processors, operating systems, and physical configurations may be possible.

The memory 229 stores instructions or data that may be executed or operated on by the processor device 225. The instructions or data may include programming code that may be executed by the processor device 225 to perform or control performance of the operations described herein. The memory 229 may include a Dynamic Random Access Memory (DRAM) device, a Static Random Access Memory (SRAM) device, flash memory, or some other memory device. In some embodiments, the memory 229 also includes a non-volatile memory or similar permanent storage and media including a hard disk drive, a floppy disk drive, a Compact Disc-ROM (CD-ROM) device, a DVD-ROM device, a DVD-RAM device, a DVD-RW device, a flash memory device, or some other mass storage for storing information on a more permanent basis.

The memory 229 may store formula data 292. The formula data 292 may include one or more mathematical formulae selected from an electronic document and each included in the electronic document as an image, vector graphics, and/or other data object; one or more formatted formulae including symbols identified by performing optical character recognition on an image or parsing a vector graphic; one or more normalized formulae; one or more generalized formulae; one or more tokens; and one or more returned formulae that are similar to or the same as one or more of the foregoing.

The communication interface 227 may transmit and receive data to and from at least one of the learner support server 101, the user device 120, and the content servers 115, depending on whether the device 200 is the learner support server 101 or the user device 120 of FIG. 1. The communication interface 227 may transmit and receive data to and from any other entities of the learner support system 100 of FIG. 1. In some embodiments, the communication interface 227 includes a port for direct physical connection to the network 105 of FIG. 1 or to another communication channel. For example, the communication interface 227 may include a Universal Serial Bus (USB) port, a Secure Digital (SD) port, a CATegory 5 (CAT-5) cable port, or similar port for wired communication with the learner support server 101, the user device 120, the content servers 115, or any other entities of FIG. 1. In some embodiments, the communication interface 227 includes a wireless transceiver for exchanging data with at least one of the learner support server 101, the user device 120, the content servers 115, or any other entities of FIG. 1 or other communication channels using one or more wireless communication methods, including IEEE 802.11, IEEE 802.16, Bluetooth®, or another suitable wireless communication method.

In some embodiments, the communication interface 227 includes a cellular communications transceiver for sending and receiving data over a cellular communications network including via Short Messaging Service (SMS), Multimedia Messaging Service (MMS), HyperText Transfer protocol (HTTP), direct data connection, Wireless Application Protocol (WAP), e-mail, or another suitable type of electronic communication. In some embodiments, the communication interface 227 includes a wired port and a wireless transceiver. The communication interface 227 may also provide other connections to the network 105 of FIG. 1 for distribution of files or media objects using standard network protocols including Transmission Control Protocol/Internet Protocol (TCP/IP), HTTP, HTTP Secure (HTTPS), and Simple Mail Transfer Protocol (SMTP), etc.

The storage 233 may include a non-transitory storage medium that stores data for providing the functionality described herein. The storage 233 may include a Dynamic Random Access Memory (DRAM) device, a Static Random Access Memory (SRAM) device, flash memory, or some other memory devices. In some embodiments, the storage 233 also includes a non-volatile memory or similar permanent storage and media including a hard disk drive, a floppy disk drive, a CD-ROM device, a DVD-ROM device, a DVD-RAM device, a DVD-RW device, a flash memory device, or some other mass storage for storing information on a more permanent basis. The storage 233 may also store instructions and/or data that are temporarily stored or loaded into the memory 229.

In some embodiments, the storage 233 includes mathematical formulae. The learner application 201 may organize the mathematical formulae, for example, by constructing a semantic operator tree for the mathematical formulae, and may generate tokens. The learner application 201 may store the tokens in the storage 233. Accordingly, the mathematical formulae may be stored in a non-transitory computer-readable medium (e.g., the storage 233 and/or the memory 229).

As illustrated in FIG. 2, the learner application 201 may include at least one of: a user interface module 202, a format module 206, a similarity module 208, and an identifier module 210. The learner application 201, including the modules 202, 206, 208, and 210, may generally include software that includes programming code and/or computer-readable instructions executable by the processor device 225 to perform or control performance of the functions and operations described herein. The learner application 201 may receive data from another one of the components of the device 200 and may store the data in one or both of the storage 233 and the memory 229. Alternately or additionally, the learner application 201 may send data to other components of the device 200 and/or may write data to one or both of the storage 233 and the memory 229.

The user interface module 202 may generally be configured to generate graphics that, when rendered, display a user interface that includes a tool to select an input mathematical formula from the electronic document. The formula module 206 may generally be configured to generate the formatted formula from the input mathematical formula, as described in more detail herein. The similarity module 208 may generally be configured to find the formulae similar to or the same as the input mathematical formula, as described in more detail herein. The identifier module 210 may generally be configured to identify a formula derivation and related content that relates to the input mathematical formula, as described in more detail herein.

The display device 231 may be communicatively coupled to the learner application 201 via the bus 212. Rendered graphics may be displayed to a learner on the display device 231.

The user interface module 202 may generate graphics that display the user interface that includes the tool that selects the input mathematical formula from the electronic document. The electronic document may include, for example, a Word or pdf document with an equation that is unfamiliar to a learner. In another example, the electronic document includes a web page, such as an article including a mathematical formula picture or a plugin that renders the input mathematical formula in a specific format.

The tool may be activated by the learner providing input effective to activate the tool. For example, the tool may be activated by the learner moving a mouse over a region of the electronic document, clicking a button on the mouse to indicate a beginning of a selection of the input mathematical formula, dragging the mouse while keeping the button pressed, and releasing the button to indicate an end of the selection of the input mathematical formula. The user interface module 202 may generate graphics that display an outline of the area selected with the mouse. In some embodiments, the user interface module 202 includes options for reselecting the region, which is helpful if, for example, a first attempt at selecting the input formula resulted in a region that failed to surround the entire input mathematical formulae. Any other suitable input devices and/or input actions may be used by the learner to activate the tool and/or to otherwise select the input mathematical formula.

The format module 206 may generate a formatted formula from a selected mathematical formula. In some embodiments, the format module 206 determines whether the selected mathematical formula is included in an image, a vector graphic, or is part of a document markup language, such as LaTex or MathML. If the selected mathematical formula is included in the image, the format module 206 may perform optical character recognition on the image to identify symbols in the selected mathematical formula. If the selected mathematical formula is included in the vector graphic, the format module 206 may parse the vector graphic to identify the symbols. If the selected mathematical formula is part of the document markup language, the format module 206 may identify the selected mathematical formula from the document markup language. After the format module 206 identifies the symbols, the format module 206 may save the symbols in a specific format as the formatted formula. In some embodiments, the format module 206 generates a query that includes the formatted formula, which is used by the similarity module 208 to query an index of formulae.

The similarity module 208 may find similar formulae that are similar to or the same as the formatted formula from an index of formulae. In some embodiments, the similarity module 208, based on the formatted formula, creates a query to search the index of formulae. For example, the similarity module 208 constructs a tree from the formatted formula, such as a semantic operator tree, a layout presentation tree, or another type of tree. The tree may include both variables and operators from the formatted formula, as well as code associated with a specific type of formatted formula. The semantic operator tree is discussed in greater detail below with reference to FIG. 7A.

The similarity module 208 may normalize the formatted formula and/or the constructed tree by ordering the formatted formula and/or the constructed tree based on predetermined rules. The predetermined rules may include an order of operators that are used to normalize the formatted formula. For example, the same formula may be expressed as $C\times V+C$ and $C+C\times V$. These are both the same formula, but the variables are in a different order. The similarity module 208 may normalize the formula by putting the addition operator before the multiplication operator, which makes both instances of the formula C+C×V. Normalization is discussed in greater detail below with reference to FIG. 7B.

In some embodiments, the similarity module 208 generates a generalized formula from the formatted formula, the constructed tree, and/or the normalized formula that replaces variables with a placeholder. For example, the similarity module 208 may generalize both X+Y and A+B as *+*. In some embodiments where multiple variables and at least one operator are inside a parenthesis, the similarity module 208 may combine the expression within the parenthesis to generate a single variable. For example, the similarity module 208 may generalize A+(B×C) to first be *×(*+*) and then *×*. The similarity module 208 may also remove variables and constants that are encoded in tags in the formatted formula and/or the constructed tree. Generalization is discussed in greater detail below with reference to FIG. 7C.

The similarity module 208 may generate a token from the formatted formula, the normalized formula, and/or the generalized formula. For example, the similarity module 208 may generate tokens that are based on the generalized formula and the constructed tree. Each token may include a content and level pair where the content describes original terms (e.g., from the formatted formula or the constructed tree) or generalized terms (e.g., placeholders) from the generalized formula. The level may include a corresponding location in the constructed tree associated with the content.

The similarity module 208 may find returned formulae that are similar to or the same as the formatted formula in the index of formulae. For example, the similarity module 208 may search the index of formulae to identify returned formulae that are similar to or the same as the selected mathematical formula. In embodiments where the similarity module 208 generates a normalized formula, a generalized formula, and/or tokens, the similarity module 208 may search the index of formulae to identify returned formulae. The returned formula may be the same as, e.g., identical to, the selected mathematical formula or may have variations, such as formulas that have an identical structure but different variable names. For example, the selected mathematical formula may be processed and represented as a tokenized formula and the similarity module 208 may identify a returned formula that is also tokenized and therefore similar to the selected mathematical formula.

In some embodiments, the similarity module 208 generates a similar score that is a measure of the similarity between the selected mathematical formula and the returned formula and returns the similar formula if the similar score exceeds a similar score threshold. In some embodiments, the similarity module 208 may return an n number of returned formulae with top-n number of scores. In some embodiments, the similarity module 208 applies a threshold similarity to find the returned formula. For example, the threshold similarity may constitute 90% (or other suitable percentage) similarity between the selected mathematical formula and the returned formula.

In some embodiments, the similarity module 208 or a crawler on the content server 115 includes a search engine that generates the index of formulae. For example, the similarity module 208 or a crawler on the content server crawls electronic documents and stores the electronic documents in the content servers 115 to identify mathematical formulae and indexes the detected mathematical formulae in the electronic documents into the index of formulae. The similarity module 208 may identify formula regions in the electronic documents that include the identified mathematical formulae, segment text lines of each of the identified mathematical formulae, and create formatted formulae therefrom. The similarity module 208 may construct a tree for each of the formatted formulae, for example a semantic operator tree, normalize the formatted formulae and/or the corresponding constructed tree, generate generalized formulae, and generalize tokens with both original and generalized terms. The similarity module 208 may store the tokens in the index of formulae, for example, in the storage 233 described in FIG. 2. The index of formulae may also include an indication of and/or a pointer to (e.g., a uniform resource locator (URL)) the electronic document in which each formula in the index of formulae is found so that the similarity module 208 may access the electronic document to identify a formula derivation and related content when a formula in the index of formulae is determined to be a similar formula with respect to the selected mathematical formula.

The identifier module 210 may be configured to identify a formula derivation and related content such as a name or terminology for the selected mathematical formula. For example, the formula derivation may include a derivation of the returned formula. In some embodiments, the identifier module 210 identifies a formula derivation from at least one of the electronic documents stored in the content server 115. For example, the identifier module 210 locates a position of the returned formula in at least one of the electronic documents and sets a current boundary around the returned formula based on how the electronic document is organized. For example, if the electronic document is paginated, the identifier module 210 may set a current boundary around the returned formula on a current page where the current boundary also extends to other pages. For example, if the returned formula is at the beginning of the current page, the identifier module 210 may include all or a portion of a previous page as part of the current boundary and include all or a portion of the current page. Alternately or additionally, the identifier module 210 may include all or a portion of the current page only within the current boundary or all or a portion of both the current page and a next page within the current boundary depending on a location of the returned formula within the current page. If the returned formula is included in a series of continuous or substantially continuous lines of formulae segmented by at least one page boundary, the current boundary may be extended to cover multiple pages to include all of the series of continuous or substantially continuous lines of formulae. For example, where the similar formula may be included in a series of continuous formulae that start at the bottom of a first page and end in the middle of a second page, the identifier module 201 may set the current boundary around the continuous formulae on the two pages. Lines of formulae may be considered to be continuous if every line in a series of lines includes a formula. Lines of formulae may be considered to be substantially continuous if, within a region of an electronic document, a percentage of lines that are categorized as including at least part of a formula exceeds a threshold value. For example, the threshold value may be 75% because the formula may be intermingled with text that describes the formula. If the percentage of lines that are part of the formula exceed 75%, the lines of formula are substantially continuous. If the percentage of lines that are part of the formula fall below 75%, the lines of formula may represent multiple formulae.

In examples where the returned formula is part of an electronic document that lacks pagination, the identifier module 210 may set an upper boundary and a lower boundary to create a current boundary around the returned formula. The upper boundary may be defined as a set distance larger than the lower boundary. For example, the upper boundary may be defined as 10 lines above the returned formula and the lower boundary may be defined as five lines below the returned formula.

After the identifier module 210 sets the current boundary, the identifier module 210 may locate other formulae within the current boundary. Because other formulae that are located around or near the returned formula are likely to be included in a derivation of the returned formula, the identifier module 210 may determine a distance between the returned formula and a corresponding one of the other formulae. Any suitable method may be implemented to determine the distance. For example, the distance may be determined as a number of lines of formulae from the corresponding other formula to the returned formula without considering a number of lines of text (e.g., descriptive text relating to the formulae) therebetween. Alternately or additionally, the distance may be determined based on both the number of lines of formulae and the number of lines of text from the corresponding other formula to the returned formula. Alternately or additionally, the distance may be determined as a percentage or fraction of page size for paginated electronic documents.

The identifier module 210 may determine the distance for each of the other formulae and calculate a score based on the distances and a similarity between each of the other formulae and the returned formula. For example, the identifier module 210 may calculate a total score (TS) that is a function of a similar score (QC_S) between the formatted formula and the returned formula and that is a sum of each similar score (CO_Si) between the returned formula and one of the other formulae. For example, an equation for calculating the total score may be:

$$TS = QC\_S * \Sigma CO\_Si * (1/(1+\exp(\alpha * LF_i + \beta * LT_i))) \quad (1)$$

where i is an index, exp refers to the number e (e.g., approximately 2.71828) raised to the power specified in parenthesis, $LF_i$ is a number of lines of formula from the ith one of the other formulae to the returned formula, $LT_i$ is a number of lines of text from the ith one of the other formulae to the returned formula, and $\alpha$ and $\beta$ are negative constant factors used to adjust a distance effect.

In some embodiments, the identifier module 210 identifies related content, such as a name of a formula, or knowledge points or terminology, by identifying returned formulae from electronic documents stored in the content servers 115 and extracting n-gram patterns from text that surround the returned formulae. For example, a similar score threshold may be set by the identifier module 210, the learner, or may be pre-set or a default value. The identifier module 210 may identify returned formulae that are similar to or the same as the selected mathematical formula based on the returned formulae having similarity scores that exceed the similar score threshold. The identifier module 210 may set a current boundary for each of the returned formulae and retrieve text within the current boundary. The current boundary may be determined in the same manner as described above with reference to identifying the formula derivation. If the text is part of a section title or is emphasized, the identifier module 210 may adjust a weight of each of the words in the text. For example, the weight may be adjusted to reflect that words that are part of titles or are emphasized may be more likely to be associated with a formula name or knowledge points or terminology. More particularly, weights of words that are part of titles or are otherwise emphasized may be increased in some embodiments. The identifier module 210 may extract repeated n-gram patterns from the retrieved text with adjusted weights. In some embodiments, the identifier module 210 filters stop words from the n-gram pattern. For example, the identifier module 210 may filter out function words such as: the, is, at, which, and on. The identifier module 210 may extract n-gram patterns with a threshold frequency from the filtered n-gram patterns. The threshold frequency may ensure or increase a probability that the words are common enough that they are associated with the returned formula. For example, a name of the returned formula may be located near the similar formula.

Figure 3:
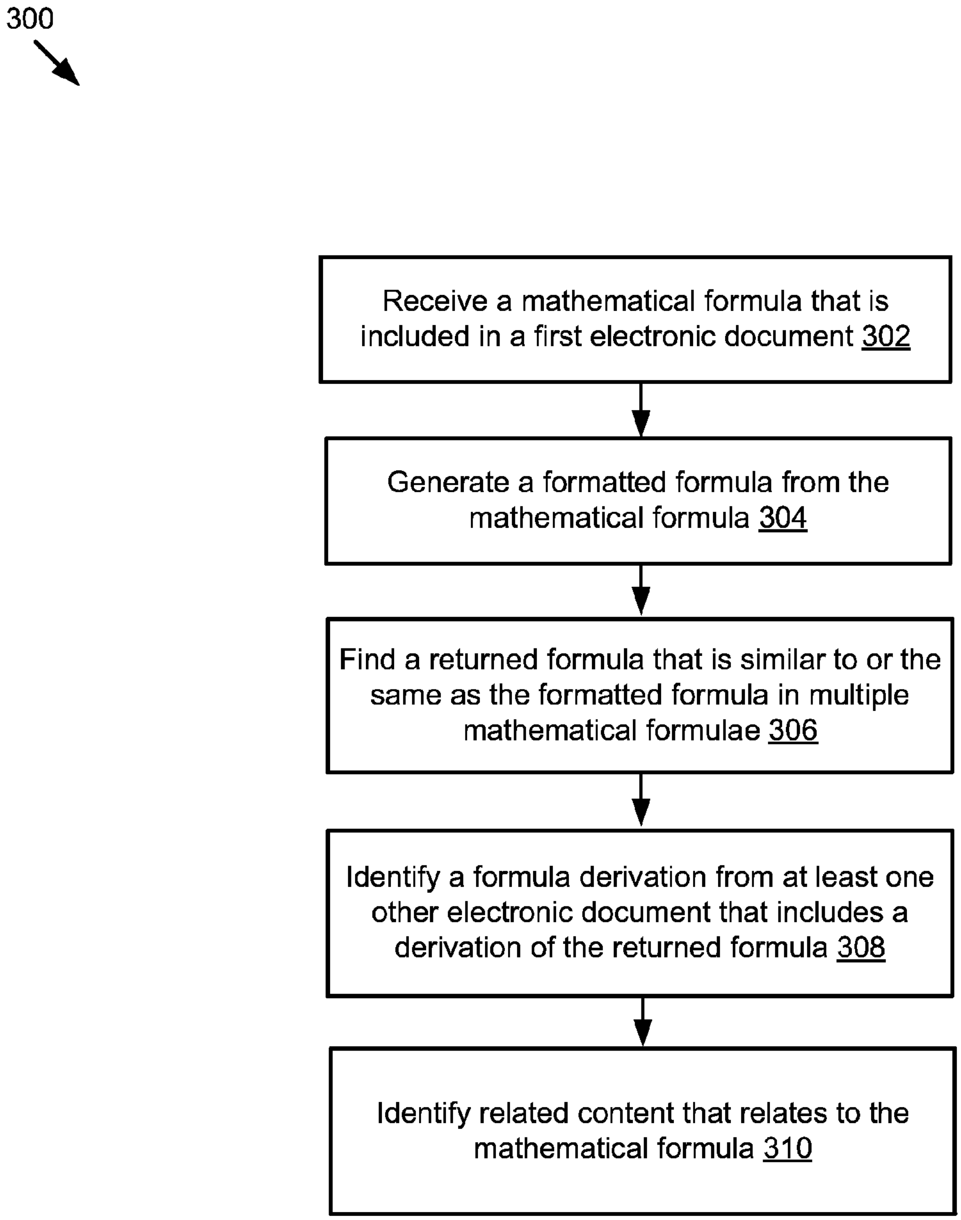
FIG. 3 is an example flow diagram of a method to identify a formula derivation for a mathematical formula and related content that relates to the mathematical formula.

FIG. 3 is an example flow diagram of a method 300 to identify a formula derivation for a mathematical formula and related content that relates to the mathematical formula. The method 300 may be implemented, in whole or in part, by one or more of the learner applications 111, 121 of FIG. 1, the device 200 of FIG. 2, or another suitable device, server, and/or system. The method 300 may begin at block 302.

In block 302, a mathematical formula may be received that is included in a first electronic document. The mathematical formula may have been selected by the learner via the user interface, for example, a user interface generated by the user interface module 202 of FIG. 2.

In block 304, a formatted formula may be generated from the mathematical formula. The format module 206 in FIG. 2 may generate the formatted formula. The formatted formula may be generated based on how the mathematical formula is represented in the first electronic document. For example, the symbols of the mathematical formula may be identified differently depending on whether the mathematical formula is included the first electronic document as an image, vector graphic, or other data object. An example method to generate the formatted formula is described with respect to FIG. 4. An example illustration of a selected mathematical formula and different corresponding formatted formulae are illustrated in FIG. 5.

Figure 7A:
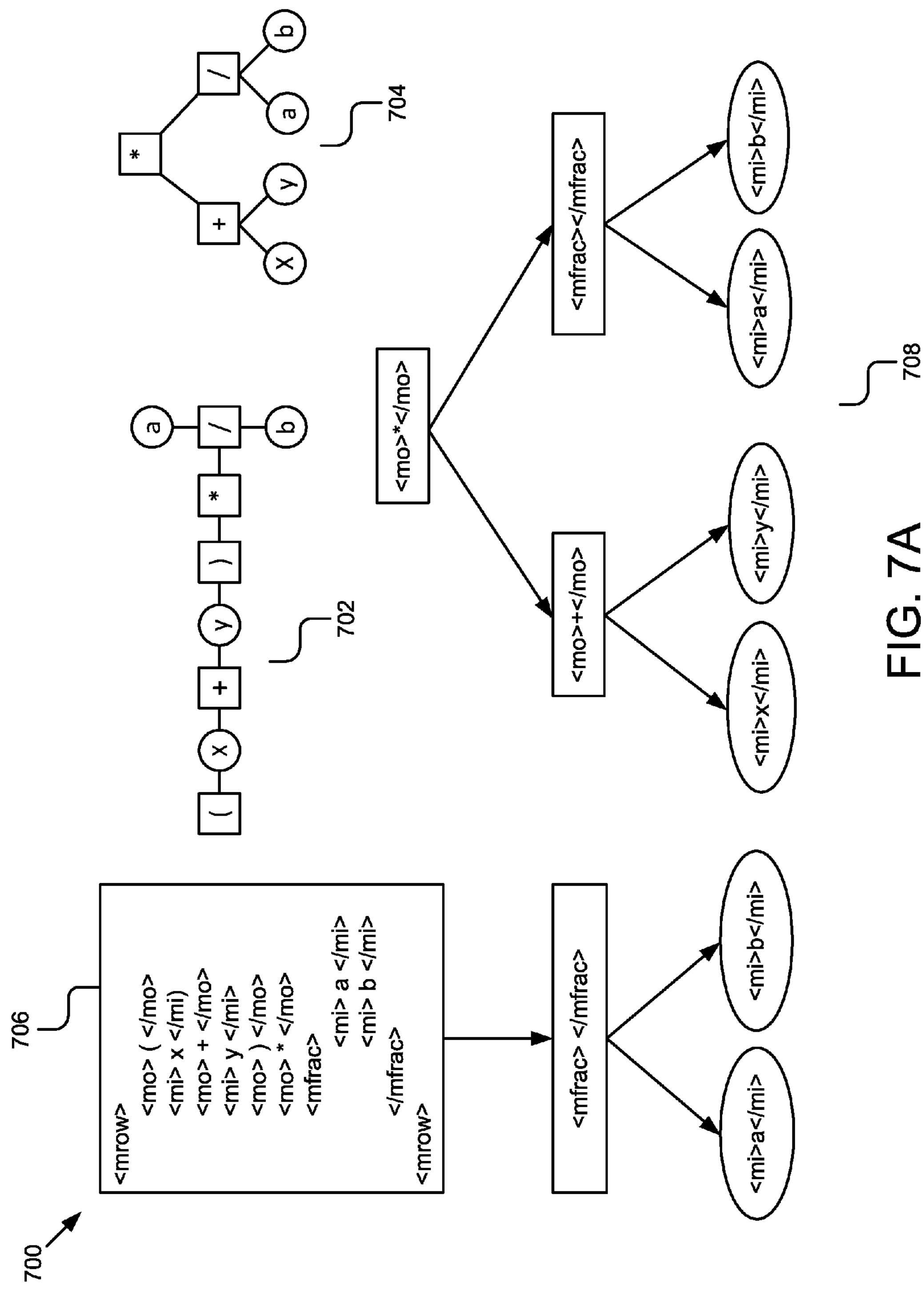
FIG. 7A illustrates example trees.
Figure 8:
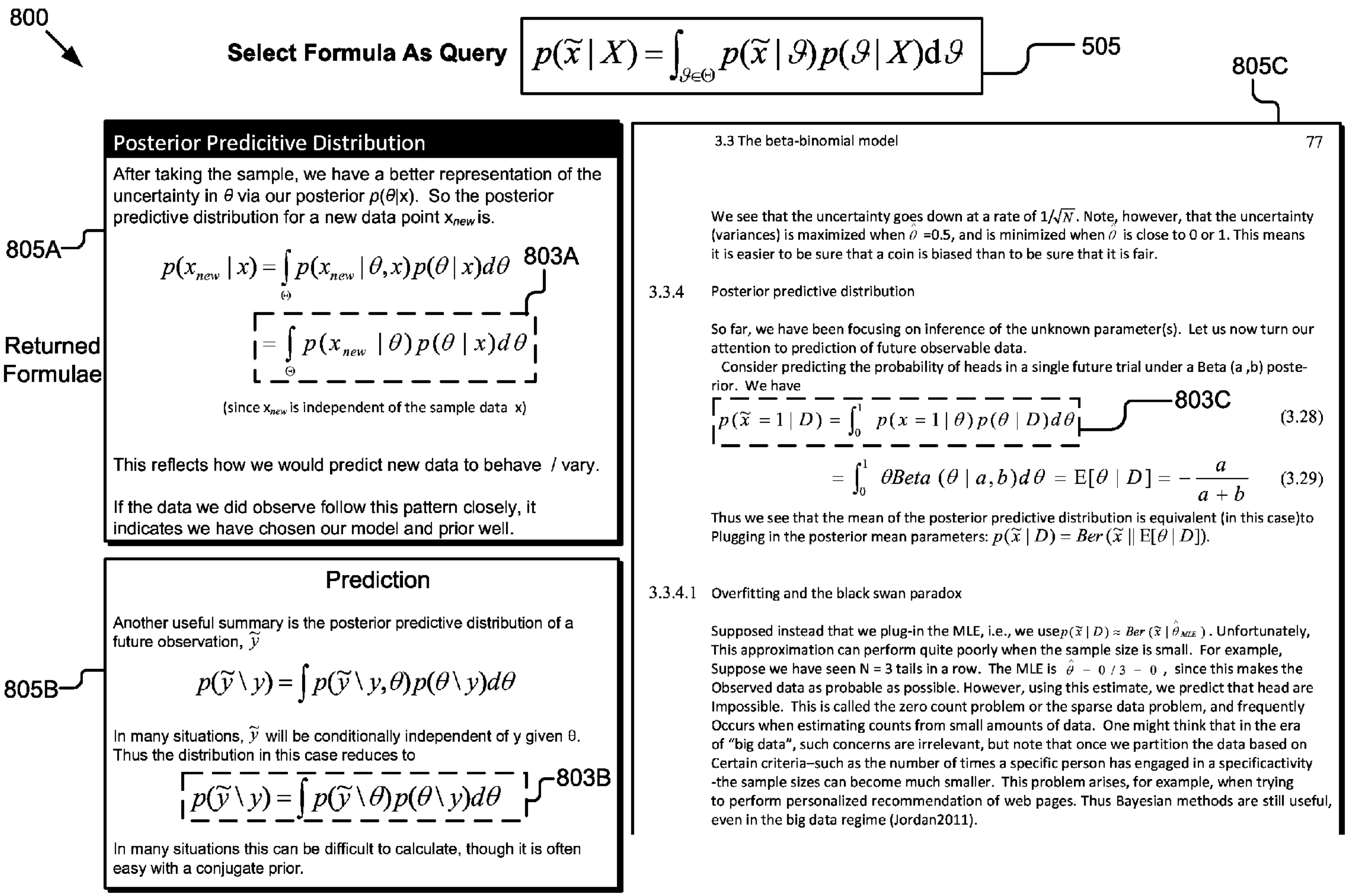
FIG. 8 illustrates an example of returned formulae that are similar to or the same as the mathematical formula of FIG. 5.

In block 306, a returned formula may be found that is similar to or the same as the formatted formula in multiple mathematical formulae, which may include the previously described index of formulae. Alternatively or additionally, the similarity module 208 of FIG. 2 may find the returned formula. In some embodiments, the returned formula (or multiple returned formulae that include the returned formula) may be found by constructing a tree (such as a semantic operator tree) using the formatted formula as a query, generating a tokenized formula with normalization and generalization, and searching the index of formulae to identify returned formulae. An example method to find the returned formula is described with respect to FIG. 6A. Example illustrations of the method to find the returned formula are illustrated in FIGS. 7A-7C. An example illustration of returned formulae is illustrated in FIG. 8. In some embodiments, the index of formulae is also generated by the similarity module 208 of FIG. 2. An example method to generate the index of formulae is described with respect to FIG. 6B.

In block 308, a formula derivation may be identified from at least one other electronic document that includes a derivation of the returned formula. For example, a current boundary may be set around the returned formula and other formulae within the current boundary may be identified based on each of their distance from and similarity to the returned formula. The identifier module 210 of FIG. 2 may identify the formula content from the at least one other electronic document stored in the content servers 115 in FIG. 1. An example method to identify the formula derivation is described with respect to FIG. 9. Example illustrations of other formulae that may be included in a derivation of the returned formula are illustrated in FIGS. 10A-10C.

In block 310, related content may be identified that relates to the mathematical formulae. The identifier module 210 of FIG. 2 may identify the related content. The related content may include, for example, knowledge points or terms associated with the mathematical formulae. An example method to identify the related content is described with respect to FIG. 11. Example illustrations of related content are illustrated in FIG. 12.

Figure 4:
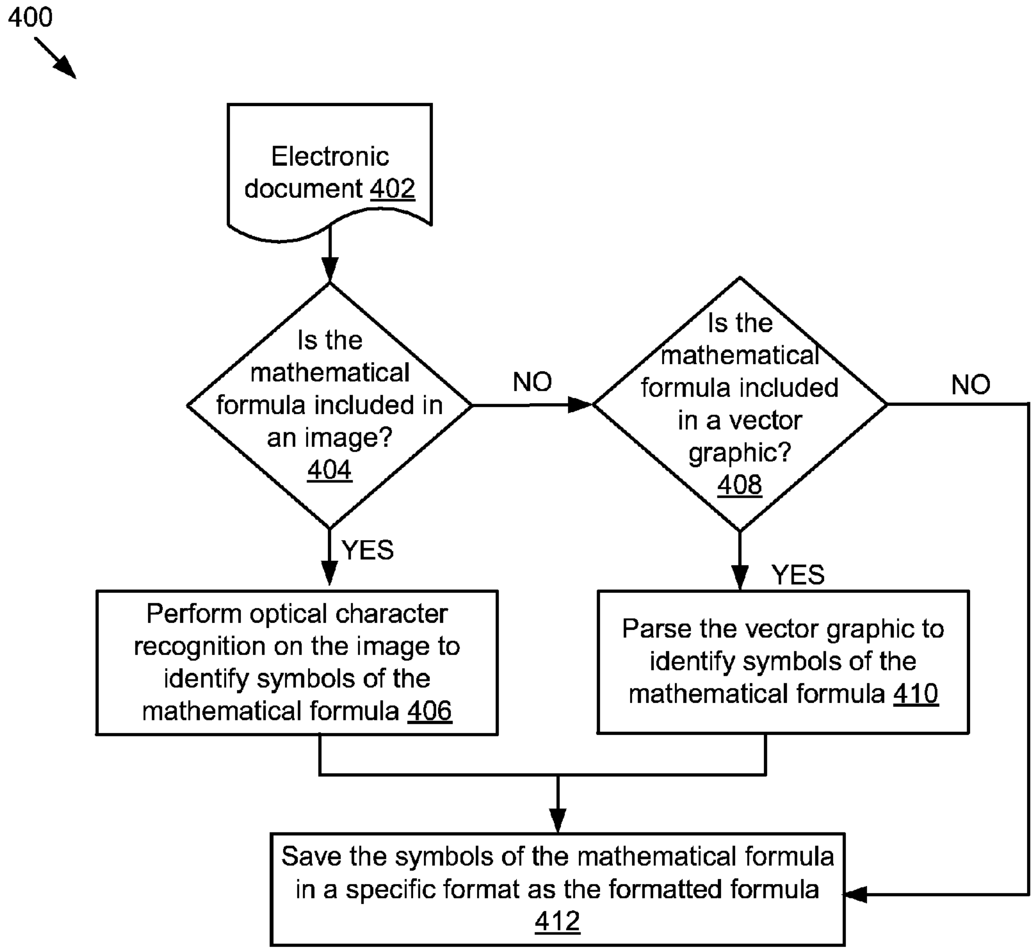
FIG. 4 is an example flow diagram of a method to generate a formatted formula from the mathematical formula.

FIG. 4 is an example flow diagram of a method 400 to generate a formatted formula from the mathematical formula. The method 400 may be implemented, in whole or in part, by one or more of the learner applications 111, 121 of FIG. 1, the device 200 of FIG. 2, or another suitable device, server, and/or system. The method 400 may begin at block 402.

In block 402, an electronic document may be received. For example, the format module 204 of FIG. 2 may receive the electronic document. The electronic document includes the mathematical formula. Block 402 may be followed by block 404.

In block 404, it is determined whether the mathematical formula is included in an image. For example, the mathematical formula may be part of a Joint Photographic Experts Group (jpeg) image, a Portable Network Graphics (png) image, an Exchangeable Image File Format (Exif) image, a Tagged Image File Format (TIFF) image, a Raw Image Format (RAW) image, or a bitmap image. Alternately or additionally, the electronic document may include a .pdf document or other type of electronic document and the mathematical formula may be selected by capturing an image of the mathematical formula, e.g., using a snapshot tool. The format module 204 of FIG. 2 may determine whether the mathematical formula is included in the image. Block 404 may be followed by block 406 ("YES" at block 404) or block 408 ("NO" at block 404).

If the mathematical formula is included in the image, the method 400 may proceed to block 406 where optical character recognition is performed on the image to identify symbols of the mathematical formula. The format module 204 of FIG. 2 may perform optical character recognition. Block 406 may be followed by block 412.

If the mathematical formula is not included in the image, block 404 may be followed by block 408 to determine whether the mathematical formula is included in a vector graphic. In some embodiments, the format module 204 of FIG. 2 may determine whether the mathematical formula is included in the vector graphic. Block 408 may be followed by block 410 ("YES" at block 408) or block 412 ("NO" at block 408).

If the mathematical formula is included in the vector graphic, block 408 may be followed by block 410 where the vector graphic is parsed to identify symbols of the mathematical formula. For example, the format module 204 of FIG. 2 may parse the vector graphic. After the symbols in the mathematical formula are identified, at block 412 the symbols of the mathematical formula are saved in a specific format as the formatted formula. In some embodiments, the format module 204 of FIG. 2 saves the symbols. The formatted formula may be included in the query. If the mathematical formula is not included in the image or the vector graphic, the mathematic formula may already be formatted and symbols of the mathematical formula may be saved in the specific format at block 412 without the processing described with respect to blocks 406 and 410. In this and other embodiments, the formatted mathematical formula may be included in a document markup language including LaTex and Mathematical Markup Language (MathML). In these cases, the symbols may be parsed from the corresponding text.

FIG. 5 is an illustration 500 of an example mathematical formula that may be selected from an electronic document 501. The mathematical formula 505 may be selected from the electronic document 501 with the tool that is included in the user interface described previously.

The mathematical formula 505 may be processed according to the method 400 of FIG. 4 to generate a corresponding formatted formula, two examples of which are illustrated in FIG. 5 at 510 (hereinafter "first formatted formula 510") and 515 (hereinafter "second formatted formula 515"). The first and second formatted formulae 510 and 515 may be generically referred to in plural or singular as "formatted formulae 510/515" or "formatted formula 510/515.". The first formatted formula 510 is in LaText format. The second formatted formula 515 is in MathML format. More generally, the formatted formula, such as the formatted formulae 510/515, generated from a selected mathematical formula, such as the mathematical formula 505, may have any suitable format. The symbols of the mathematical formula 505 may be identified according to the method 400 of FIG. 4.

According to the LaTex format, \left may refer to the position of the preceding variable. In this example, Heft may refer to P being the first variable. In addition, \overline may refer to creating a tilde over the x, a forward slash (/) may create a line between variables, and some variables may be represented with words (e.g. "theta" may cause "θ" to be rendered).

According to the MathML format, the <mi> element may signify a presence of an identifier; the <mo> element may signify a presence of an operator; the <mfenced> element may refer to surrounding content with fences, for example, parentheses; the <mrow> element may refer to a horizontal row of items; the <mover> element may refer to an accent or a limit over an expression; and the <munder> element may refers to an accent or a limit under an expression.

Figure 6A:
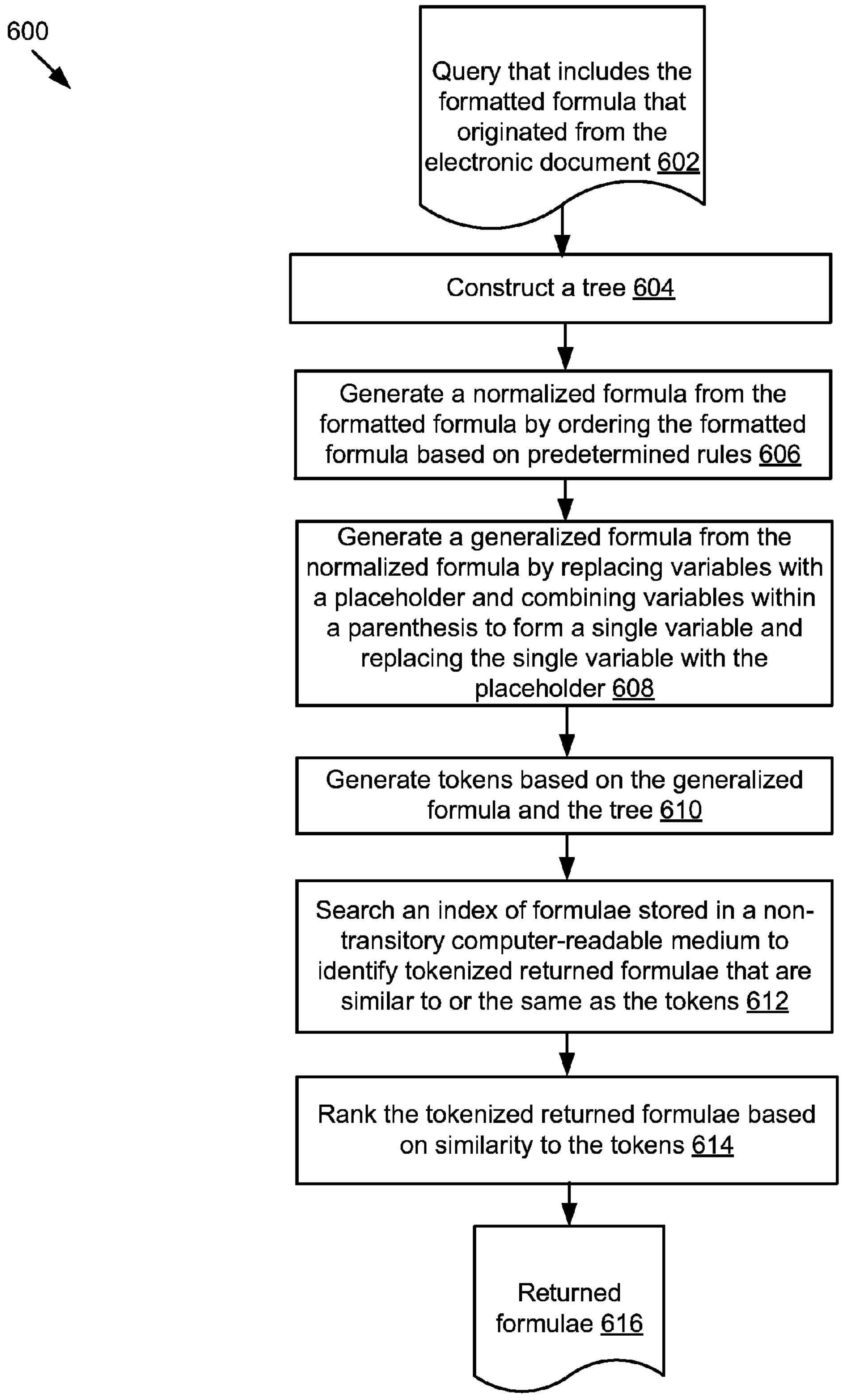
FIG. 6A illustrates an example flow diagram of a method to identify a returned formula that is similar to or the same as the formatted formula of FIG. 4.

FIG. 6A illustrates an example flow diagram of a method 600 to identify a returned formula that is similar to or the same as the formatted formula of FIG. 4. The method 600 may be implemented, in whole or in part, by one or more of the learner applications 111, 121 of FIG. 1, the device 200 of FIG. 2, or another suitable device, server, and/or system. The method 600 may begin at block 602.

In block 602, a query that includes the formatted formula, such as the formatted formula from block 412 of FIG. 4, is received. As already described above, the formatted formula may originate from an electronic document, such as the electronic document in block 402 of FIG. 4.

In block 604, a semantic operator tree may be constructed. For example, the similarity module 208 in FIG. 2 may construct the tree from the operators and variables such that the mathematical formula may be recreated by traversing one or more nodes of the tree. For example, X+Y may be constructed into the tree where X and Y are the child nodes and + is the parent node. Additionally or alternatively, other types of operator trees may be created. For example, a layout presentation tree may be created where some operators are represented on a horizontal axis, for example multiplication and addition, and some operators are represented on a vertical axis, for example division.

In block 606, a normalized formula may be generated from the formatted by ordering the formatted formula based on predetermined rules. For example, the similarity module 208 of FIG. 2 may normalize the formatted formula. The predetermined rules may include, for example, an order of the operations including substitution, addition, multiplication, and then division. By using a same order of operations, formulae that may look different on the surface may be identified as being the same or similar to the returned formulae.

In block 608, a generalized formula may be generated from the normalized formula by replacing variables with a placeholder and combining variables within a parenthesis to form a single variable and replacing the single variable with the placeholder. For example, X+Y may be generalized to *+*, A−B may be generalized to *−*, A×B may be generalized to *×*, and X/Y may be generalized to */*. When an expression is within a parenthesis, the expression may be generalized to a single expression. For example, (X+Y) may be generalized to *. In some embodiments, the generalized formula may include markup language for rendering the mathematical formula on a web page. The similarity module 208 in FIG. 2 may generate the generalized formula.

In block 610, tokens may be generated based on the generalized formula and the tree. For example, the similarity module 208 of FIG. 2 may generate the tokens. The tokens may include a content level pair where the content describes general terms and original terms and the level describes a corresponding location in the tree for the content.

In block 612, an index of formulae stored in a non-transitory computer-readable medium may be searched to identify returned formulae that are similar to or the same as the tokens. The similarity module 208 of FIG. 2 may search the index of formulae. The similarity between the tokens and the tokenized returned formulae may include identical formulae or formulae each with a similarity to the tokenized formula that is greater than a threshold similarity. For example, the similarity module 208 may identify matches of the tokenized formula where the tokenized returned formulae are similar to or the same as the mathematical formula with minor variations, such as an order of the operators, the symbols used, etc. In some embodiments, the similarity between the tokens and the tokenized returned formulae may be based on a similar score threshold. In block 614, the tokenized returned formulae may be ranked based on similarity to the tokens. Alternately or additionally, the similarity module 208 of FIG. 2 may rank the tokenized returned formulae. In some embodiments, the tokenized returned formulae may be ranked in descending order based on their similarity scores and output as returned formulae 616.

Figure 6B:
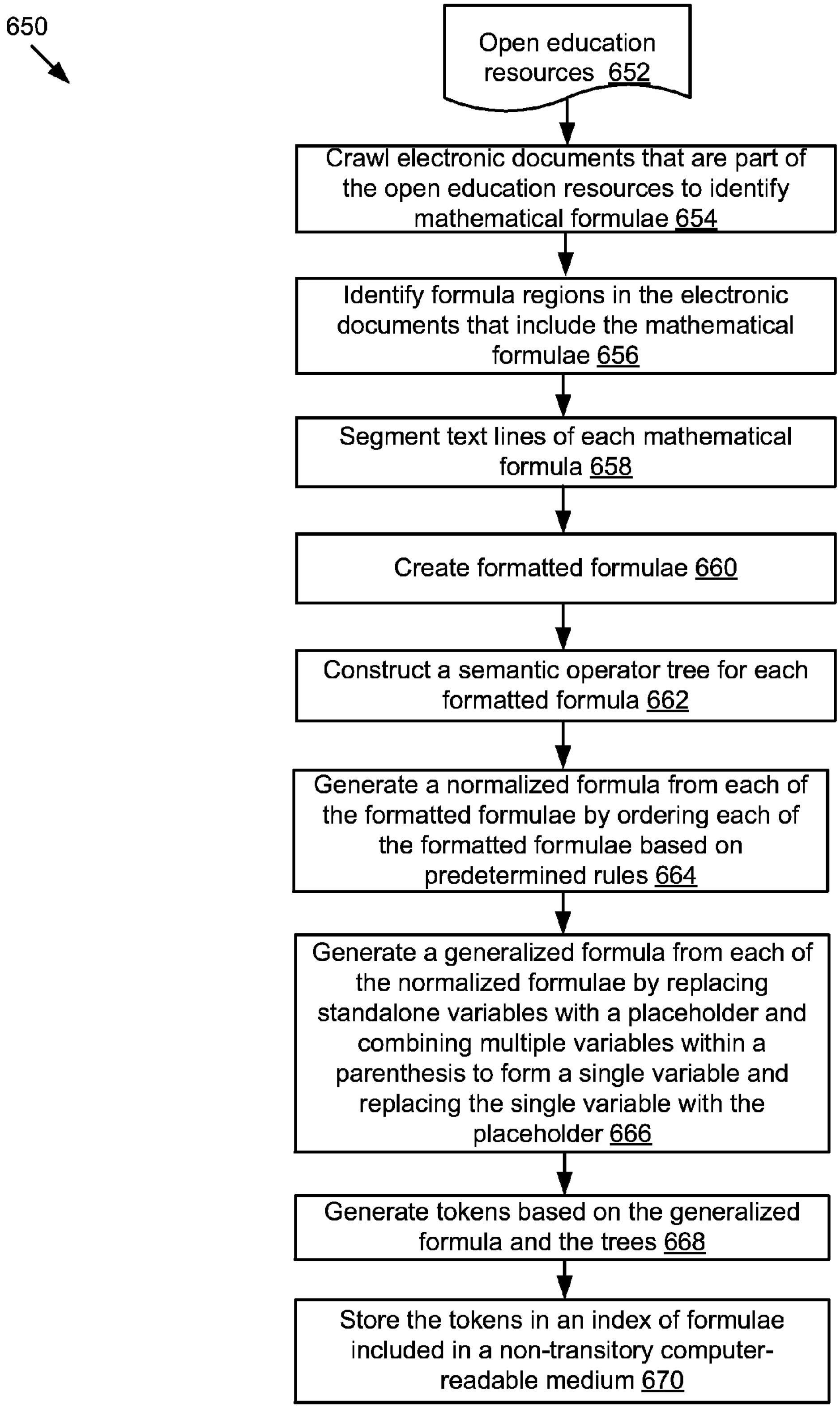
FIG. 6B illustrates an example flow diagram of a method to create an index of formulae from mathematical formulae that are included in electronic documents.

FIG. 6B illustrates an example flow diagram of a method 650 to create an index of formulae from mathematical formulae that are included in open education resources 652. The method 650 may receive electronic documents that are part of the open education resources 652. The electronic documents may be stored in the content servers 115 in FIG. 1. In block 654, the electronic documents that are part of the open education resources may be crawled to identify mathematical formulae. For example, the similarity module 208 in FIG. 2 may crawl the open education resources 652. In some embodiments, the similarity module 208 or the content server 115 includes an academic crawler that extracts electronic documents in formats that commonly include mathematical formulae, for example, pdfs, html etc., mathematical formulae presented with a document markup language, images, or vector graphics. The electronic documents may be extracted from the open education resources and imported into the storage 233 illustrated in FIG. 1.

In block 656, formula regions in the electronic documents are identified that include the mathematical formulae. In some embodiments, the similarity module 208 in FIG. 2 may identify the formula regions.

In block 658, lines of text may be segmented from lines of formula in the identified formula regions. For example, the similarity module 208 may segment the lines of text from the lines of formula. The lines of text may be segmented from the lines of formula to aid in identifying the mathematical formulae. In block 660, formatted formulae may be created. For example, the steps described in the method of FIG. 4 may be performed by the format module 206 to create the formatted formulae.

In block 662, a semantic operator tree may be created for each formatted formula. Each semantic operator tree may be created by the similarity module 208 of FIG. 2. In block 664, a normalized formula may be generated from each of the formatted formulae by ordering each of the formatted formulae based on predetermined rules In some embodiments, the similarity module 208 of FIG. 2 may normalize each of the formatted formulae.

In block 666, a generalized formula may be generated from each of the normalized formula by replacing stand-alone variables with a placeholder and combining multiple variables within a parenthesis to form a single variable with the placeholder. In some embodiments, the similarity module 208 of FIG. 2 generates the generalized formulae. In block 668, tokens are generated based on the generalized formulae and the trees. The similarity module 208 of FIG. 2 may generate the tokens.

In block 670, the tokens may be stored in an index of formulae included in a non-transitory computer-readable medium. For example, the tokens may be stored in the storage 233 of FIG. 2. In some embodiments, the index of formulae in FIG. 6B is the same index of formulae that is searched in block 612 of FIG. 6A.

FIG. 7A illustrates example trees 700 that represent the same mathematical formula: (X+Y)*(a/b). The layout presentation tree 702 may include a horizontal representation of the variables associated with the addition and multiplication operators and a vertical representation of the variables associated with the division operator. The semantic operator tree 704 may be traversed as an in-order traversal, which starts with the child nodes to recreate the mathematical formula. For example, first the left-hand subtree is traversed to create (X+Y). Then the right-hand subtree is traversed to create (a/b). Lastly, the two subtrees are combined to create (X+Y)*(a/b).

Although the two trees 702 and 704 represent the same equation, a corresponding MathML representation 706 or 708 of each of the two trees is different. For example, the MathML representation 706 of the layout presentation tree 702 organizes the (X+Y)*into a row, and then illustrates the division operator before the variables. In comparison, the MathML representation 708 of the semantic operator tree 704 organizes the mathematical formula similar to how the semantic operator tree 704 is organized.

FIG. 7B illustrates an example normalized formula 710. In this example, both C×V+C and C+C×V are the same formula with different orders. When predetermined rules are applied to the mathematical formulae, the mathematical formulae may be normalized by rearranging the order, as needed, to be: C+C×V. In some embodiments, the similarity module 208 of FIG. 2 applies the order of operation rules to determine how to normalize the mathematical formulae.

FIG. 7C illustrates example generalized formulae 720. In this example, each variable is replaced with an asterisk, which represents a placeholder for any variable. In addition, where multiple variables are grouped within a parenthesis, the variables may be simplified as being associated with a single placeholder. For example, in the first row (X+Y) may be represented as *.

Figure 7D:
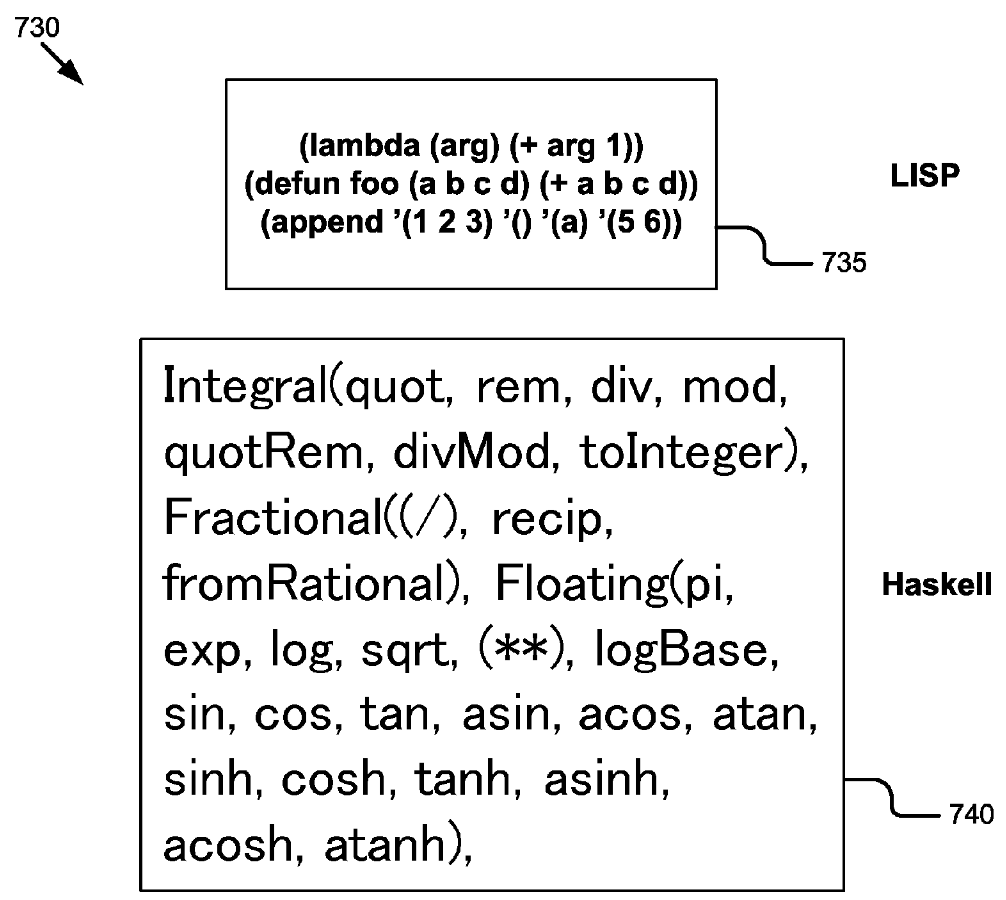
FIG. 7D illustrates examples of similar code snippets in different functional programming languages.

FIG. 7D illustrates examples 730 of similar code snippets 735 and 740 in different functional programming languages. In some embodiments, codes or expressions in some functional programming languages may include structure as part of the mathematical formulae. As a result, the codes or expressions may be presented in similar structures. The similarity module 208 may identify similar code snippets in addition to identifying returned formulae. In this example, the code snippets 735 arein the LISP functional programming language and the code snippets 740 are in the Haskell functional programming language. Another example functional programming language includes Erlang.

The code snippets 735 in LISP include examples where the mathematical formulae are processed in Polish notation. For example, the first line establishes a function (lambda (arg) (+arg 1)). The function may be called by passing it to a function definition. The second line includes an example of the function definition defun, which stands for define function. The third line uses an append procedure to append 1, 2, 3, a, 5, and 6.

The functional coding in Haskell of the code snippet 740 includes type classes integral, fractional, and floating, and class methods associated with each type of class. For example, the integral class includes class methods quot, rem, div, mod, quotRem, divMod, and toInteger. Quot is an integer division with the remainder truncated towards 0, rem is an integer division with the remainder having the sign of the dividend, div is integer division with the remainder truncated towards negative infinity, quotRem takes a dividend and a divisor as arguments and returns a (quotient, remainder) pair, and divMod takes a dividend and a divisor as arguments and returns a (div, mod) pair.

FIG. 8 illustrates an example 800 of returned formulae 803A-803C (hereinafter collectively "similar formulae 803") that are similar to or the same as the mathematical formula 505 of FIG. 5. Each of the returned formulae 803 may be included in a corresponding education website 805A-805C (hereinafter collectively "education websites 805"). The mathematical formula 505 may be selected as the query as discussed previously. A method, such as the method 600 described in FIG. 6A, may be executed to identify that the returned formulae 803 are similar to or the same as the mathematical formula 505. For example, as compared to the mathematical formula 505, each of the returned formulae 803 includes a same basic layout with minor variations, such as a presence of an interval, and at least some different symbols for the variables.

Figure 9:
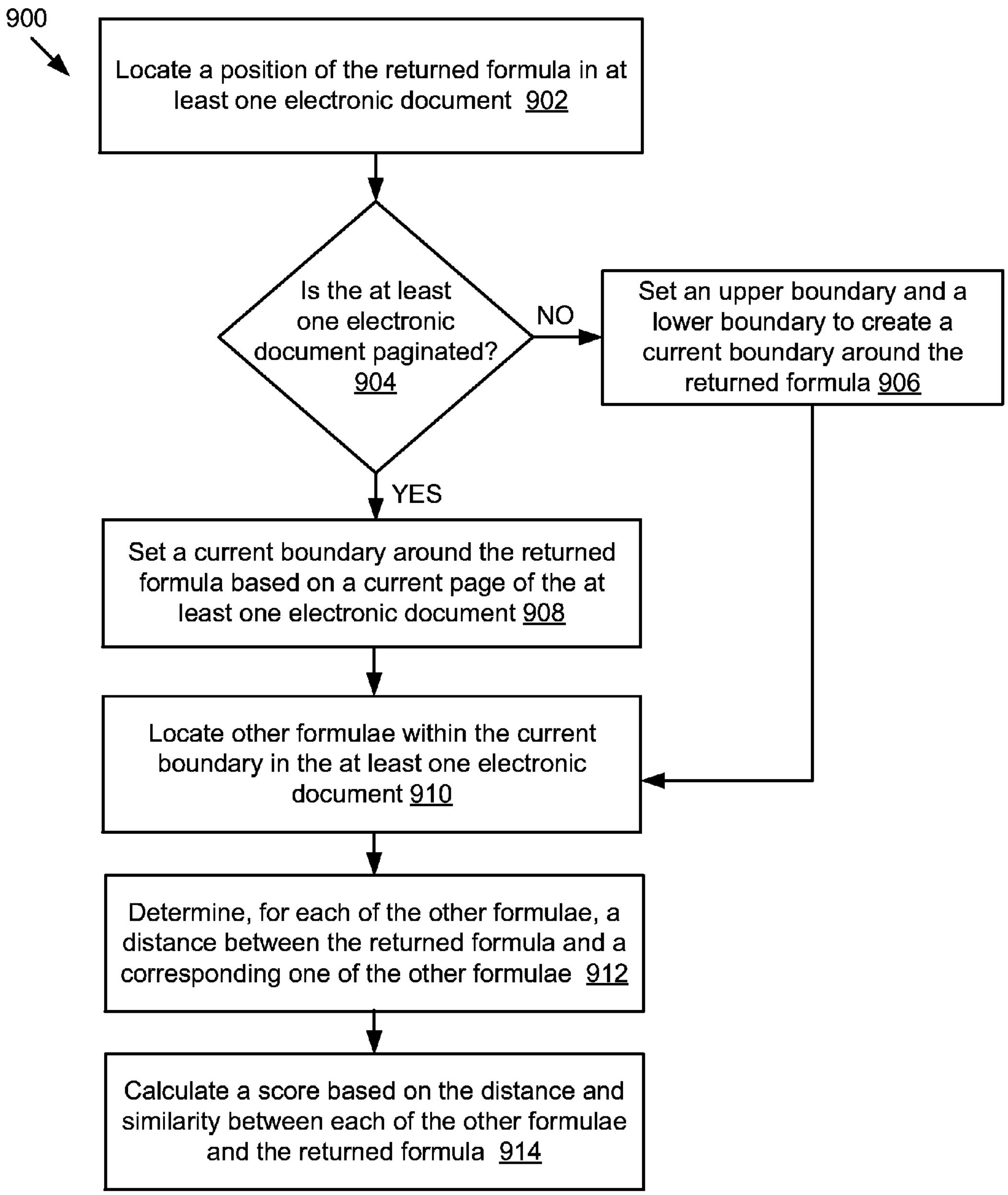
FIG. 9 illustrates an example flow diagram of a method to identify a formula derivation.
Figure 10A:
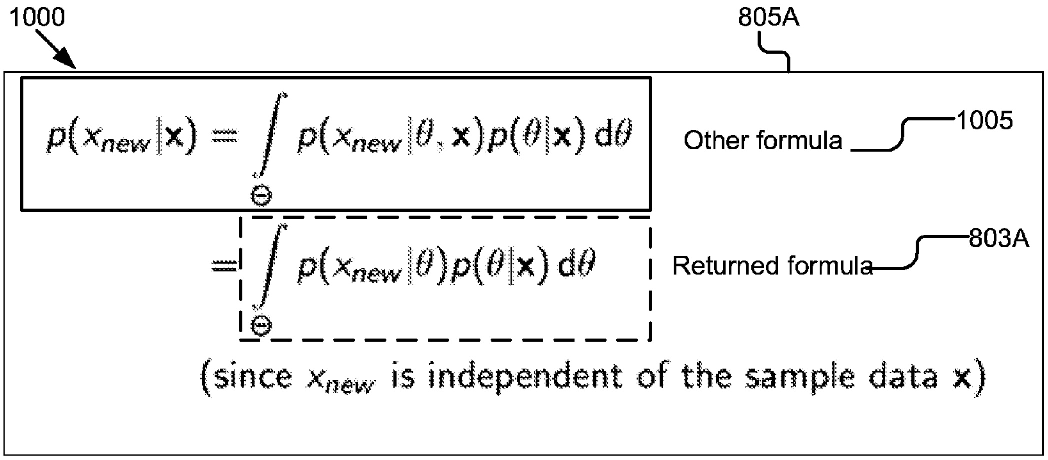
FIG. 10A illustrates an example of a formula that is determined to be included in a derivation of one of the returned formulae of FIG. 8.
Figure 10B:
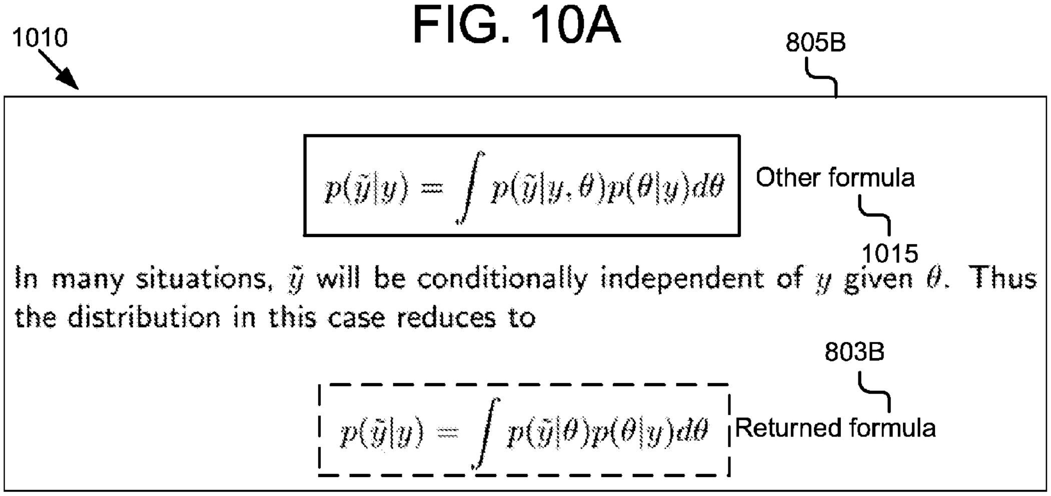
FIG. 10B illustrates another example of a formula that is determined to be included in a derivation of one of the returned formulae of FIG. 8.
Figure 10C:
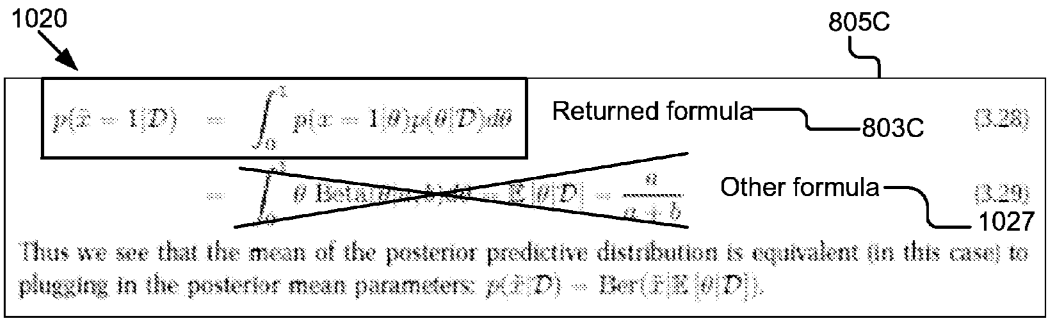
FIG. 10C illustrates an example of a formula that is rejected as being included in a derivation of one of the returned formula of FIG. 8.

FIG. 9 illustrates an example flow diagram of a method 900 to identify a formula derivation. Derivations of a mathematical formula in general may often be located in close proximity to the mathematical formula within a corresponding learning material (e.g., education website, text book, etc.). Accordingly, the formula derivation may be identified based on distances of other formulae from and similarity of the other formulae to a corresponding returned formula, as described in more detail below. The method 900 may be implemented, in whole or in part, by one or more of the learner applications 111, 121 of FIG. 1, the device 200 of FIG. 2, or another suitable device, server, and/or system. The method 900 may begin at block 902.

At block 902, a position of the returned formula is located in at least one electronic document. In some embodiments, the identifier module 210 of FIG. 2 locates the position of the returned formula in the at least one electronic document generated and/or hosted by a corresponding one of the content servers 115 in FIG. 1. For example, the returned formula may be located in a .pdf document hosted by one of the content servers 115 of FIG. 1.

At block 904, it is determined whether the at least one electronic document is paginated. For example, the identifier module 210 of FIG. 2 may determine whether the at least one electronic document is paginated. If the at least one electronic document is paginated ("YES" at block 904), at block 908, a current boundary may be set around the returned formula based on a current page of the at least one electronic document, where the current page refers to the page of the at least one electronic document that includes the returned formula. In some embodiments, the identifier module 210 of FIG. 2 may set the current boundary based on the current page. For example, if the returned formula is located at the beginning of the current page, the identifier module 210 may include all or a portion of a previous page as part of the current boundary and/or may include all or a portion of the current page. If the returned formula is included in a series of continuous or substantially continuous lines of formulae segmented by at least one page boundary, the current boundary may be extended to cover multiple pages to include all of the series of continuous or substantially continuous lines of formulae. In some embodiments, a threshold amount of the series of continuous or substantially continuous formulae may be included within the current boundary. Block 908 may be followed by block 910 discussed below.

In some embodiments, if the at least one education website is not paginated ("NO" at block 904), at block 906 an upper boundary and a lower boundary may be set to create the current boundary around the returned formula. In some embodiments, the current boundary includes an upper boundary and a lower boundary where the upper boundary is a set distance larger than the lower boundary. For example, the upper boundary may be set at 10 lines, 15 lines, or another number of lines above the returned formula and the lower boundary may be set at 5 lines, 7 lines, or another number of lines below the lower boundary. Alternately or additionally, if the returned formula is included within a non-paginated education website in a series of continuous or substantially continuous lines of formulae, the upper and lower boundaries may be extended a sufficient number of lines to include a beginning and/or ending of the series of continuous or substantially continuous lines of formulae. Block 906 may be followed by block 910.

At block 910, other formulae may be located within the current boundary in the at least one education website. For example, the identifier module 210 of FIG. 2 may locate the other formulae within the current boundary. Limiting the other formulae to those located within the current boundary, instead of searching the entire education website for other formulae, may advantageously reduce processing overhead. Where the returned formula is included in a series of continuous or substantially continuous formulae, the other formulae located within the current boundary may include any formulae other than the returned formula included in the series of continuous or substantially continuous formulae.

At block 912, for each of the other formulae, a distance between the returned formula and a corresponding one of the other formulae may be determined. For example, the identifier module 210 of FIG. 2 may determine the distance for each of the other formulae. Alternately or additionally, and although not illustrated in FIG. 9, the method 900 may additionally include calculating, for each of the other formulae, a similarity between the returned formula and a corresponding one of the other formulae. At block 914, a score for the formula derivation associated with the returned formula may be calculated based on the distance and the similarity between each of the other formulae and the returned formula. In some embodiments, the identifier module 210 of FIG. 2 may calculate the score. The score may include the total score TS discussed above that is based on both the similar score QC_S between the returned formula and the formatted formula in the query, and the similar score CO_Si between the returned formula and each of the other formulae. In some embodiments, a total score for the formula derivation associated with each of multiple returned formulae may be determined according to the method 900 of FIG. 9 and the associated formula derivations may be ranked according to their total scores. Higher total scores and/or the rankings may indicate to the learner those associated formula derivations that are more likely to include a relevant formula derivation, such as a derivation of the corresponding returned formula. Whereas each returned formula may be similar to or the same as the selected mathematical formula, derivations of returned formulae may be viewed by the learner to learn about a derivation of the selected mathematical formula.

FIG. 10A illustrates an example 1000 of a formula 1005 that is determined to be included in a derivation of one of the returned formulae 803 of FIG. 8. In particular, the formula 1005 is determined to be included in a derivation of the returned formulae 803A. With respect to the returned formulae 803A, the formula 1005 is an example of one of the "other formulae" discussed in the context of FIG. 9. In this example, the formula 1005 is close to (e.g., a short distance from) the returned formula 803A. In particular, the formula 1005 is a distance of one line from the returned formula 803A. The only difference between the formula 1005 and the returned formula 803A is that the formula 1005 includes an extra x variable compared to the returned formula 803A. At least based on the relatively small distance and the similarity between the formula 1005 and the returned formula 803A, the formula 1005 may be determined to be included in a derivation of the returned formula 803A.

FIG. 10B illustrates an example 1010 of another formula 1015 that is determined to be included in a derivation of one of the returned formulae 803 of FIG. 8. In particular, the formula 1015 is determined to be included in a derivation of the returned formula 803B. With respect to the returned formula 803B, the formula 1015 is an example of one of the "other formulae" discussed in the context of FIG. 9. In this example, the formula 1015 is a distance of three lines from the returned formula 803B. The only difference between the formula 1015 and the returned formula 803B is that $p(\tilde{y}|y,\theta)$ in the formula 1015 reduces to $p(\tilde{y}|\theta)$ in the returned formula 1015. At least based on the relatively small distance and the similarity between the formula 1015 and the returned formula 803B, the formula 1015 may be determined to be included in a derivation of the returned formula 803B.

FIG. 10C illustrates an example 1020 of a formula 1027 that is rejected as being included in a derivation of one of the returned formulae 803 of FIG. 8. In particular, the formula 1027 is determined as not being included in a derivation of the returned r formula 803C. With respect to the returned formula 803C, the formula 1027 is an example of one of the "other formulae" discussed in the context of FIG. 9. In this example, the formula 1027 is a distance of one line from the returned formula 803C. Notwithstanding the relatively close proximity of the formula 1027 to the returned formula 803C, it is apparent from FIG. 10C that a similarity between the formula 1027 and the returned formula 803C is relatively low. Accordingly, a difference between the returned formula 803C and the formula 1027 may be great enough that the formula 1027 is rejected as being included in a derivation of the returned formula 803C. For example, the total score TS (see discussion above) calculated for the returned formula 803C based on, e.g., its distance from and similarity to the formula 1027 and/or to one or more other formulae that include the formula 1027 and that are within a current boundary surrounding the returned formula 803C may be relatively low.

Figure 11:
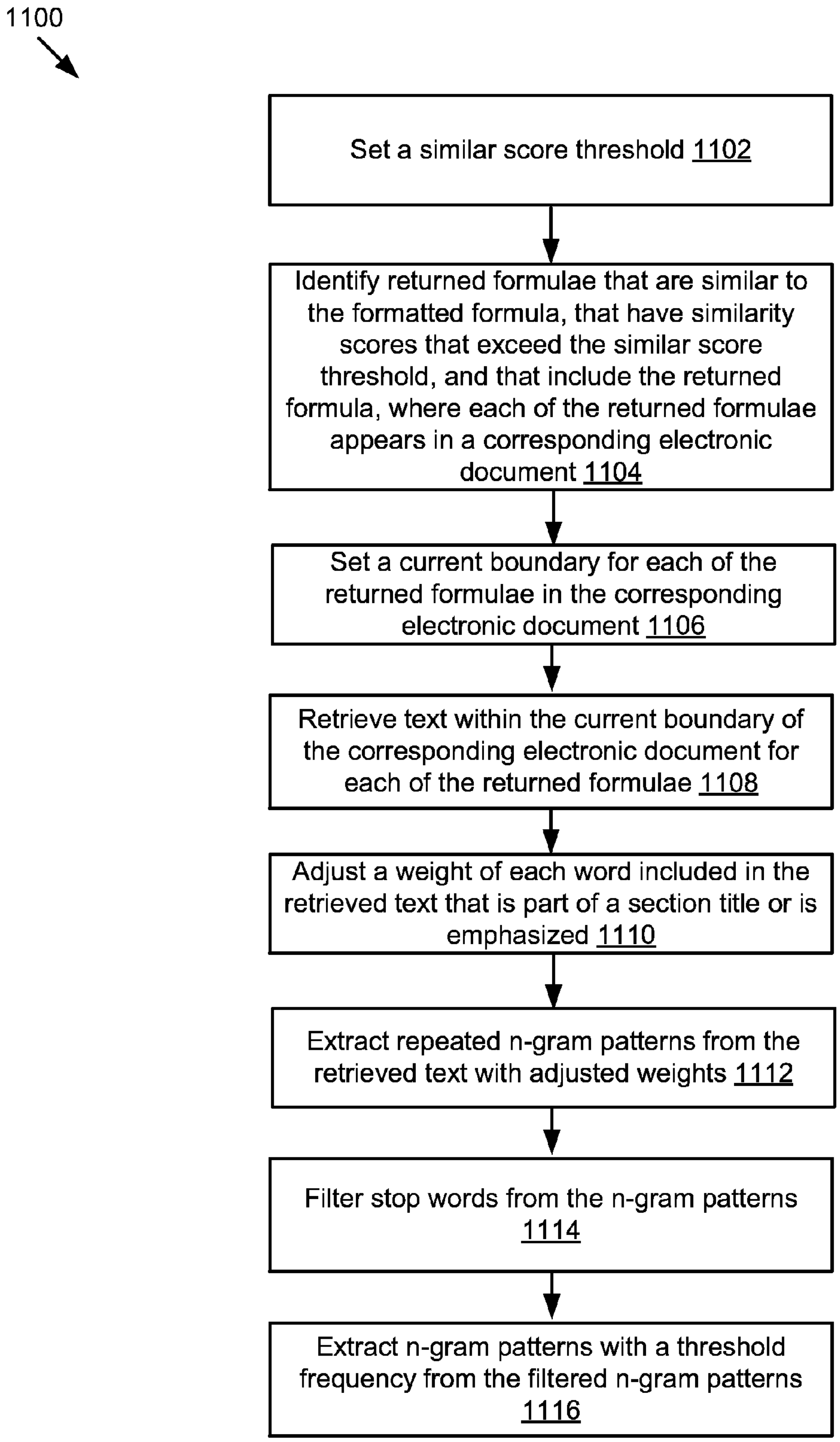
FIG. 11 illustrates an example flow diagram of a method to identify related content that relates to a mathematical formula.

FIG. 11 illustrates an example flow diagram of a method 1100 to identify related content that relates to a mathematical formula. The mathematical formula may include a mathematical formula selected by a learner and about which the learner would like more information. Similar to the discussion above, the mathematical formula may be referred to as the "selected mathematical formula" for convenience in the discussion that follows. Alternately or additionally, the method 1100 may involve a formatted formula that may be generated for the selected mathematical formula according to any suitable method, such as the method 400 of FIG. 4. The method 1100 may be implemented, in whole or in part, by one or more of the learner applications 111, 121 of FIG. 1, the device 200 of FIG. 2, or another suitable device, server, and/or system. The method 1100 may begin at block 1102.

At block 1102, a similar score threshold may be set. The identifier module 210 of FIG. 2 may set the similar score threshold. Alternately or additionally, the similar score threshold may be set at a default value, based on input from a learner, and/or based on machine learning.

At block 1104, returned formulae may be identified that are similar to or the same as the formatted formula, that have similarity scores that exceed the similar score threshold, and that include the similar formula, where each of the returned formulae appears in a corresponding electronic document. In some embodiments, the identifier module 210 of FIG. 2 identifies returned formulae, where each of the returned formulae appears in the corresponding electronic document generated by at least one of the content server 115 in FIG. 2.

At block 1106, a current boundary may be set for each of the returned formulae in the corresponding document. The identifier module 210 in FIG. 2 may set the current boundary. The current boundary may be set for each of the returned formulae as described with respect to FIG. 9, for example. At block 1108, text may be retrieved within the current boundary of the corresponding electronic document for each of the returned formulae. The text may include knowledge points or terminology that may help describe the corresponding one of the returned formulae. The identifier module 210 in FIG. 2 may retrieve the text.

At block 1110, a weight of each word included in the retrieved text that is part of a section title or is emphasized may be adjusted. For example, words that are part of the section title or are emphasized may be more likely to be knowledge points or terminology related to the returned formula. Alternatively or additionally, the identifier module 210 may adjust the weight of each word included in the retrieved text that is part of the section title or is emphasized.

At block 1112, repeated n-gram patterns from the retrieved text with adjusted weights may be extracted. The identifier module 210 of FIG. 2 may extract the repeated n-gram patterns. Stop words may be defined by an administrator or based on a list of commonly accepted stop words.

At block 1114, stop words may be filtered from the n-gram patterns. For example, the identifier module 210 of FIG. 2 may filter the stop words from the n-gram patterns. At block 1116, n-gram patterns with a threshold frequency may be extracted from the filtered n-gram patterns. In some embodiments, the identifier module 210 of FIG. 2 may extract the n-gram patterns with the threshold frequency.

FIG. 12 is an illustration 1200 of examples of related content. For example, the identifier module 210 and/or other module(s) of FIG. 2 may identify the returned formulae 803 in the education websites 805 and otherwise execute the method 1100 of FIG. 11 to identify knowledge points or terminology related to the returned formulae 803 that may be related to the selected mathematical formula of interest to the learner. In the illustration 1200 of FIG. 12, the identifier module 210 may identify that "posterior predictive distribution" is terminology 1210 related to the returned formulae based at least on the terminology 1210 being part of an n-gram pattern and also being present in the title on one of the pages.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, such computer-readable media may include tangible computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method to identify information about a mathematical formula found in a first electronic document, the method comprising:

receiving a mathematical formula that has been selected directly from the first electronic document;

generating a formatted formula from the mathematical formula;

finding a returned formula that is similar to or the same as the formatted formula in a plurality of mathematical formulae;

identifying related content that relates to the mathematical formula by:

setting a similar score threshold;

identifying returned formulae that are similar to or the same as the formatted formula, that have similarity scores that exceed the similar score threshold, and that include the returned formula, wherein each of the returned formulae appears in a corresponding other electronic document;

setting a current boundary for each of the returned formulae in the corresponding other electronic document;

retrieving text within the current boundary of the corresponding other electronic document for each of the returned formulae;

adjusting a weight of each word included in the retrieved text that are part of a section title or are emphasized;

extracting repeated n-gram patterns from the retrieved text with adjusted weights;

filtering stop words from the repeated n-gram patterns; and extracting n-gram patterns with at least a threshold frequency from the filtered n-gram patterns; and identifying from at least one other electronic document a formula derivation that includes a detailed explanation and a derivation of the returned formula.

2. The method of claim 1, further comprising generating graphics that, when rendered, display a user interface that includes a tool that is configured to select the mathematical formula from the first electronic document.

3. The method of claim 1, wherein generating the formatted formula comprises:

determining whether the mathematical formula is included in an image;

in response to the mathematical formula being included in the image, performing optical character recognition on the image to identify symbols of the mathematical formula; and saving the symbols of the mathematical formula in a specific format as the formatted formula.

4. The method of claim 1, wherein generating the formatted formula comprises:

determining whether the mathematical formula is included in a vector graphic;

in response to the mathematical formula being included in the vector graphic, parsing the vector graphic to identify symbols of the mathematical formula; and saving the symbols of the mathematical formula in a specific format as the formatted formula.

5. The method of claim 1, wherein identifying from the at least one other electronic document a formula derivation that includes the detailed explanation and the derivation of the returned formula comprises:

locating a position of the returned formula in the at least one other electronic document;

determining whether the at least one other electronic document is paginated;

in response to the at least one other electronic document being paginated, setting a current boundary around the returned formula based on a current page of the at least one other electronic document;

locating other formulae within the current boundary in the at least one other electronic document;

determining, for each of the other formulae, a distance between the returned formula and a corresponding one of the other formulae; and calculating a score based on the distance and similarity between each of the other formulae and the returned formula.

6. The method of claim 1, wherein identifying from the at least one other electronic document the formula derivation that includes the detailed explanation and the derivation of the returned formula comprises:

locating a position of the returned formula in the at least one other electronic document;

determining whether the at least one other electronic document is paginated;

in response to the at least one other electronic document not being paginated, setting an upper boundary and a lower boundary to create a current boundary around the returned formula;

locating other formulae within the current boundary in the at least one other electronic document;

determining, for each of the other formulae, a distance between the returned formula and a corresponding one of the other formulae; and calculating a score based on the distance and similarity between each of the other formulae and the returned formula.

7. A non-transitory computer-readable medium that includes computer-readable instructions stored thereon that are executable by a processor to perform or control performance of operations comprising:

receiving a mathematical formula found in a first electronic document that has been selected directly from the first electronic document;

generating a formatted formula from the mathematical formula;

finding a returned formula that is similar to or the same as the formatted formula in a plurality of mathematical formulae;

identifying related content that relates to the mathematical formula by:

setting a similar score threshold;

identifying returned formulae that are similar to or the same as the formatted formula, that have similarity scores that exceed the similar score threshold, and that include the returned formula, wherein each of the returned formulae appears in a corresponding other electronic document;

setting a current boundary for each of the returned formulae in the corresponding other electronic document;

retrieving text within the current boundary of the corresponding other electronic document for each of the returned formulae;

adjusting a weight of each word included in the retrieved text that are part of a section title or are emphasized;

extracting repeated n-gram patterns from the retrieved text with adjusted weights;

filtering stop words from the repeated n-gram patterns; and extracting n-gram patterns with at least a threshold frequency from the filtered n-gram patterns; and identifying from at least one other electronic document a formula derivation that includes a detailed explanation and a derivation of the returned formula.

8. The non-transitory computer-readable medium of claim 7, wherein the operations further comprise generating graphics that, when rendered, display a user interface that includes a tool that is configured to select the mathematical formula from the first electronic document.

9. The non-transitory computer-readable medium of claim 7, wherein the operations further comprise:

determining whether the mathematical formula is included in an image;

in response to the mathematical formula being included in the image, performing optical character recognition on the image to identify symbols of the mathematical formula; and saving the symbols of the mathematical formula in a specific format as the formatted formula.

10. The non-transitory computer-readable medium of claim 7, wherein identifying from the at least one other electronic document the formula derivation that includes the detailed explanation and the derivation of the returned formula comprises:

locating a position of the returned formula in the at least one other electronic document;

determining whether the at least one other electronic document is paginated;

in response to the at least one other electronic document being paginated, setting a current boundary around the returned formula based on a current page of the at least one other electronic document;

locating other formulae within the current boundary in the at least one other electronic document;

determining, for each of the other formulae, a distance between the returned formula and a corresponding one of the other formulae; and calculating a score based on the distance and similarity between each of the other formulae and the returned formula.

11. The non-transitory computer-readable medium of claim 7, wherein identifying from the at least one other electronic document the formula derivation that includes the detailed explanation and the derivation of the returned formula comprises:

locating a position of the returned formula in the at least one other electronic document;

determining whether the at least one other electronic document is paginated;

in response to the at least one other electronic document not being paginated, setting an upper boundary and a lower boundary to create a current boundary around the returned formula;

locating other formulae within the current boundary in the at least one other electronic document;

determining, for each of the other formulae, a distance between the returned formula and a corresponding one of the other formulae; and calculating a score based on the distance and similarity between each of the other formulae and the returned formula.

12. A system to identify information about a mathematical formula found in a first electronic document from at least one other electronic document, the system comprising:

a format module configured to receive a mathematical formula that has been selected directly from the first electronic document and generate a formatted formula from the mathematical formula;

a similarity module communicatively coupled to the format module, the similarity module configured to find a returned formula that is similar to or the same as the formatted formula in a plurality of mathematical formulae; and an identifier module communicatively coupled to the similarity module, the identifier module configured to perform operations comprising:

identifying related content that relates to the mathematical formula by:

setting a similar score threshold;

identifying returned formulae that are similar to or the same as the formatted formula, that have similarity scores that exceed the similar score threshold, and that include the returned formula, wherein each of the returned formulae appears in a corresponding other electronic document;

setting a current boundary for each of the returned formulae in the corresponding other electronic document;

retrieving text within the current boundary of the corresponding other electronic document for each of the returned formulae;

adjusting a weight of each word included in the retrieved text that are part of a section title or are emphasized;

extracting repeated n-gram patterns from the retrieved text with adjusted weights;

filtering stop words from the repeated n-gram patterns; and extracting n-gram patterns with at least a threshold frequency from the filtered n-gram patterns; and identifying from at least one other electronic document a formula derivation that includes a detailed explanation and a derivation of the returned formula.

13. The system of claim 12, further comprising a user interface module coupled to the format module, the user interface module configured to generate graphics that, when rendered, display a user interface that includes a tool that is configured to select the mathematical formula from the first electronic document.

14. The system of claim 12, wherein the format module is further configured to generate the formatted formula by:

determining whether the mathematical formula is included in an image;

in response to the mathematical formula being included in the image, performing optical character recognition on the image to identify symbols of the mathematical formula; and saving the symbols of the mathematical formula in a specific format as the formatted formula.

15. The system of claim 12, wherein the format module is further configured to generate the formatted formula by:

determining whether the mathematical formula is included in a vector graphic;

in response to the mathematical formula being included in the vector graphic, parsing the vector graphic to identify symbols of the mathematical formula; and saving the symbols of the mathematical formula in a specific format as the formatted formula.

16. The system of claim 12, wherein the identifier module is further configured to identify from the at least one other electronic document the formula derivation that includes the detailed explanation and the derivation of the returned formula by:

locating a position of the returned formula in the at least one other electronic document;

determining whether the at least one other electronic document is paginated;

in response to the at least one other electronic document being paginated, setting a current boundary around the returned formula based on a current page of the at least one other electronic document;

locating other formulae within the current boundary in the at least one other electronic document;

determining, for each of the other formulae, a distance between the returned formula and a corresponding one of the other formulae; and calculating a score based on the distance and similarity between each of the other formulae and the returned formula.

17. The system of claim 12, wherein the identifier module is further configured to identify from the at least one other electronic document the formula derivation that includes the detailed explanation and the derivation of the returned formula by:

locating a position of the returned formula in the at least one other electronic document;

determining whether the at least one other electronic document is paginated;

in response to the at least one other electronic document not being paginated, setting an upper boundary and a lower boundary to create a current boundary around the returned formula;

locating other formulae within the current boundary in the at least one other electronic document;

determining, for each of the other formulae, a distance between the returned formula and a corresponding one of the other formulae; and calculating a score based on the distance and similarity between each of the other formulae and the returned formula.

* * * * *